(12) United States Patent
Cole et al.

(10) Patent No.: US 10,523,920 B2
(45) Date of Patent: *Dec. 31, 2019

(54) STEREOSCOPIC IMAGE PROCESSING METHODS AND APPARATUS

(71) Applicant: NextVR Inc., Newport Beach, CA (US)

(72) Inventors: David Cole, Laguna Beach, CA (US); Alan McKay Moss, Laguna Beach, CA (US)

(73) Assignee: NextVR Inc., Newport Beach, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/937,583

(22) Filed: Mar. 27, 2018

(65) Prior Publication Data

US 2018/0324408 A1     Nov. 8, 2018

Related U.S. Application Data

(63) Continuation of application No. 14/954,590, filed on Nov. 30, 2015, now Pat. No. 9,930,318, which is a
(Continued)

(51) Int. Cl.
*H04N 13/271*    (2018.01)
*H04N 13/128*    (2018.01)
(Continued)

(52) U.S. Cl.
CPC ......... *H04N 13/271* (2018.05); *H04N 13/128* (2018.05); *H04N 13/161* (2018.05); *H04N 13/20* (2018.05); *H04N 13/239* (2018.05); *H04N 13/257* (2018.05); *H04N 2013/0081* (2013.01)

(58) Field of Classification Search
CPC .. H04N 13/271; H04N 13/257; H04N 13/128; H04N 13/20; H04N 13/239; H04N 13/161; H04N 2013/0081
See application file for complete search history.

(56) References Cited

U.S. PATENT DOCUMENTS 9,204,127 B1 * 12/2015 Cole .................. H04N 13/20
9,930,318 B2 *  3/2018 Cole .................. H04N 13/20
(Continued)

*Primary Examiner* — Michael Lee
(74) *Attorney, Agent, or Firm* — Straub & Straub; Michael P. Straub; Stephen T. Straub

(57) ABSTRACT

Stereoscopic image processing methods and apparatus are described. Left and right eye images of a stereoscopic frame are examined to determine if one or more difference reduction operations designed to reduce the luminance and/or chrominance differences between the left and right frames is within a range used to trigger a difference reduction operation. A difference reduction operation may involve assigning portions of the left and right frames to different depth regions and/or other region categories. A decision on whether or not to perform a difference reduction operation is then performed on a per regions basis with at the difference between the left and right eye portions of at least one region being reduced when a difference reduction operation is to be performed. The difference reduction process may, and in some embodiments is, performed in a precoder which processes left and right eye images of stereoscopic frames prior to stereoscopic encoding.

19 Claims, 11 Drawing Sheets

Related U.S. Application Data continuation of application No. 13/744,400, filed on Jan. 17, 2013, now Pat. No. 9,204,127.

(60) Provisional application No. 61/587,642, filed on Jan. 17, 2012.

(51) Int. Cl.
| | | |
|---|---|---|
| *H04N 13/161* | (2018.01) | |
| *H04N 13/257* | (2018.01) | |
| *H04N 13/20* | (2018.01) | |
| *H04N 13/239* | (2018.01) | |
| *H04N 13/00* | (2018.01) | |

(56) References Cited

U.S. PATENT DOCUMENTS

| 2009/0096863 A1* | 4/2009 | Kim .................. G06K 9/00604 348/42 |
| 2013/0076872 A1* | 3/2013 | Wang .................. H04N 13/0022 348/51 |

* cited by examiner

STEREOSCOPIC IMAGE PROCESSING METHODS AND APPARATUS

RELATED APPLICATIONS

The present application is a continuation of U.S. patent application Ser. No. 14/954,590 filed on Nov. 30, 2015 which is a continuation of U.S. patent application Ser. No. 13/744,400 filed on Jan. 17, 2013 which claims the benefit of U.S. Provisional Patent Application Ser. No. 61/587,642 filed Jan. 17, 2012 each of which is hereby expressly incorporated by reference in its entirety.

FIELD

The present invention is related to the field of stereoscopic imagery and more particularly, to methods and apparatus for encoding stereoscopic image data, e.g., image data representing one or more stereoscopic frames, e.g., a sequence of stereoscopic frames.

BACKGROUND

Stereoscopic images, e.g., 3D images, are growing in popularity. In the case of stereoscopic images each image normally corresponds to a pair of frames, e.g., a left eye image and a right eye image, captured from cameras spaced apart by a distance approximating the distance between a human's left and right eye. During playback, the left eye image is supplied to the left eye and the right eye image is supplied to the right eye. Minor differences between the left and right eye are perceived and give a sense of depth.

Reflections off objects and/or other camera issues may result in undesired differences in the left and right eye images beyond the differences which allow for the perception of depth. Such undesirable differences may have negative effects on the perceived image quality of a stereoscopic image which is played back and viewed.

While some undesirable differences between left and right eye images may be due to issues relating to image capture, transmission and storage constraints may also have an impact on perceived image quality. To reduce the amount of data required to store and/or communicate images, stereoscopic images are often encoded, e.g., compressed, using lossy compression techniques. Some encoding techniques involve encoding the content of one image in a stereoscopic image pair representing a stereoscopic frame as a function of the other image in the stereoscopic frame. Large differences between the left and right eye images of an image pair representing a stereoscopic frame may render such compression techniques less effective than is desirable and/or cause undesirable coding artifacts which may be visible when viewing a stereoscopic image generated during playback from the encoded left and right eye images corresponding to a stereoscopic frame.

In view of the above discussion, it should be appreciated that it would be desirable if one or more methods and/or apparatus could be developed which could reduce or eliminate the negative effects of undesirable or excessive differences between left and right eye images of a stereoscopic frame. While methods and apparatus which could be incorporated into an encoder would be desirable it would be particularly desirable if methods of processing stereoscopic images to reduce undesirable differences could be developed which were generally encoder independent, e.g., which could be used with any of a wide variety of stereoscopic encoding techniques.

SUMMARY

Methods and apparatus for processing stereoscopic image data, e.g., luminance values (Y), first chrominance (Cr) values and second chrominance (Cb) values, corresponding to left and right eye images of a stereoscopic frame, are described. The luminance image values may, and often are, provided at a higher resolution, e.g., more values per a given portion of an image, than the chrominance values. The methods and apparatus of the invention do not depend on the resolution of the luminance and/or chrominance values and the described techniques can be used whether the luminance and chrominance values are provided at the same or different resolutions.

While the methods are described in terms of sets of Y, Cr, and Cb image values the methods of the invention are equally well suited for systems which represent stereoscopic frames using sets of R, G, and B (Red, Green, Blue) values.

The image data corresponding to multiple sequential frames, e.g., corresponding to a video sequence of a movie, television program or other video sequence, may be processed, e.g., sequentially, prior to encoding and/or as part of an encoding process in accordance with one or more embodiments described herein.

The processing of a stereoscopic frame, e.g., a pair of left and right eye images, will now be described with the understanding that to process video sequences the same or similar processing would be performed to multiple stereoscopic frames in the video sequence.

In accordance with one feature, a frame is first checked to determine if it would benefit from a reduction in the level of differences between the left and right eye images in terms of first, second and/or third image values, e.g., luminance values, first chrominance values and/or second chrominance values. The determination for each one of the different types of values can be made independently and in parallel. In some embodiments one of the three sets of values is processed while in other embodiments more than one set, e.g., all three sets of values are processed and subjected to a possible disparity, e.g., difference, reduction operation to reduce the difference between the values of a given type between the left and right eye images. Since a human's visual system tends to be more sensitive to luminance than chrominance, in embodiments where the disparity check and possible reduction operation is performed on a single type of image values, the single type of image values is normally the luminance values rather than one of the sets of chrominance values.

To determine if a frame will benefit from a disparity reduction operation an overall disparity value is generated for the type of data under consideration, e.g., luminance data for purposes of explanation. In the case of luminance data, the overall disparity value is an indication of the overall luminance disparity between the left and right eye images of the frame being processed. If the overall disparity value falls within a range used to determine that the frame will benefit from a disparity reduction operation, a disparity reduction operation will be performed on the frame.

In some embodiments determining if the disparity reduction operation will be beneficial includes comparing the overall disparity value for the frame to a first, lower threshold and to a second, higher threshold. In some embodiments the lower threshold is 20% of the maximum possible disparity (e.g., maximum possible luminance difference) between the left eye image and the right eye image. In at least one such embodiment the second upper threshold is 70% of the maximum possible disparity. Disparity's outside this range are indicative of significant differences between the left and right eye images, e.g., they are different images possibly because of an image capture error or some other reason, and attempting to reduce the disparity may result in ghosting due to an object of one image being copied into the other in an attempt to reduce the disparity. Accordingly, to avoid possibly introducing changes that might worsen the end image result when the overall disparity value is outside the range identified for purposes triggering a disparity reduction operation, the disparity reduction operation will be skipped.

However, when the overall disparity value for a type of image data, e.g., luminance data, is within the range used to trigger a disparity reduction operation, a disparity reduction operation will be preformed to reduce the difference between the left and right eye images in terms of the type of data with the overall disparity value within the range used to trigger the disparity reduction operation.

As part of a disparity reduction operation, image values of one and/or both images of a stereoscopic frame will be altered to reduce the disparity that was detected between the left and right eye images.

Decisions on whether to perform a disparity reduction operation on a frame is performed independent for each of the types of image data being processed. Thus, a decision to perform a luminance disparity reduction operation does not mean that a chrominance disparity reduction will also be performed. However, a chrominance disparity reduction may be performed depending on the overall chrominance disparity values (ODVCr, ODVCb) for the frame being processed. Similar to luminance, in some embodiments the overall chrominance disparity, e.g., (ODVCr) is evaluated to determine within it is within the range set by a lower threshold of 20% of maximum chrominance disparity possible (e.g., 20% of maximum chrominance Cr disparity possible) and an upper threshold of 70% of maximum chrominance disparity possible (e.g., 70% of maximum chrominance Cr disparity possible) and if it is within the range than a chrominance disparity reduction may be performed (e.g., on the chrominance Cr).

In some embodiments the area of a frame, and thus the area of the left and right eye images which correspond to the frame, is treated as a single region for disparity reduction purposes. However, in more sophisticated embodiments portions of the left eye image and portions of the right eye image are independently mapped to various regions which are supported. In some embodiments the different regions which are supported correspond to different depths, e.g., different distances from the camera to the objects in the image portion being mapped to a region. For example, in one embodiment a foreground region, a middle region and a background region are supported. The mapping of image portions to regions involves in one embodiment generating an image depth map for the left eye image and an image depth map for the right eye image with each different depth of the depth map corresponding to a different region, e.g., foreground, middle or background. A variety of know stereoscopic depth map generation techniques may be used to generate the depth map used to assign image portions to regions. Each region of an image, e.g., left eye image or right eye image, may include a plurality of non-contiguous portions of the image assigned to the region, e.g., foreground. The left and right eye images may have different numbers of pixel values assigned to different regions but with the total number of pixels in each of the left and right eye images normally being the same.

Performing a difference reduction operation on a frame in some embodiments is performed on a per region basis. In one embodiment the decision whether or not to perform a difference reduction operation on a particular region of the left and right eye images is made in the same or similar manner as the processes of deciding whether a difference reduction operation is to be performed on a frame but with the image, e.g., pixel, values of the region of the left and right eye images being processed to generate a disparity value for the region as opposed to the entire frame. Since a region, e.g., the foreground region, in the left eye image may include a different number of pixel values than the same region, e.g., foreground region, in the right eye image the sets of image values, e.g., luminance values, are scaled so that the sets of values can be compared as if they each included the same number of pixel values. If the number of pixels in the region in the left eye and the right eye are the same, there is no need for the scaling operation, also sometimes referred to as a normalization operation. For example, there is no need for scaling in the case of generating an overall disparity value for a frame when the left and right eye images include the same number of pixel values.

In one embodiment, after scaling, if needed, the pixel values of a left eye region are processed to generate a left eye histogram and the right eye region pixel values are processed to generate a histogram for the same region of the right eye. The histogram, in some embodiments, is a set of counts where each count is a count of the number of pixels in the region having the pixel value to which the count corresponds. For example if pixel values can range from 0 to 255, there would be 256 counts of pixel values where the count corresponding to a pixel value is sometimes stored in a memory location sometimes referred to as a "bin". The count for any one pixel value is in the range of 0 to the total number of pixels in the region. In some embodiments, scaling is performed after the histograms have been generated.

The left and right eye image values are compared to generate a set of difference values representing the difference between the counts in the bins of the left eye image and the counts in the bins of the right eye image. Thus, in some embodiments if there are 256 pixel values 256 difference values are generated with each of the 256 difference values corresponding to a different pixel value. In one embodiment the difference value for the region is generated as a weighted sum of the difference values. For example, in one particular embodiment the difference value of each bin is multiplied by the pixel value corresponding to the bin with the results of this weighting being summed to form the overall pixel value difference. This weighting takes into consideration that the bins correspond to different intensities. For example a luminance pixel value of 255 representing a fully on pixel which will contribute approximately 255 times as much to the overall luminosity of a region than a 0 luminance intensity pixel value.

The overall disparity value generated for a region is checked to see if it falls within the range used to trigger a disparity reduction operation. The range may be the same as that described with regarding to making a decision on whether or not to perform a disparity reduction operation on the frame however a different range may be used.

If the disparity reduction value generated for the region falls within the range used to trigger a disparity reduction operation on the region a disparity reduction operation will be performed on the region. Such an operation will result in the changing of one or more pixel, i.e., image, values in the left and/or right eye image portions which were determined to correspond to the region being processed. The difference (disparity) reduction operation modifies image values to reduce the difference between the histograms, e.g., scaled histograms if scaling was performed, for the left and right eye image portions corresponding to the region subject to the difference reduction operation. In some embodiments the difference reduction operation is performed using a histogram matching operation. In other embodiments the difference reduction operation is performed using an earth mover's distance operation. Both the histogram matching operation and the earth mover's distance operation are know operations which can be used to determine how to alter image values to reduce the difference between histograms of image values corresponding to different images.

While a difference operation will be performed on at least one region of a frame in which a decision was made to perform a difference reduction operation, not all regions may be subject to a difference reduction operation. For example, when region based difference reduction decisions are made, a decision to perform a difference reduction operation may result in a difference reduction operation being performed on background image areas but not foreground image areas depending on the region based decisions which are made.

A processed set of frame data is generated from the received image data and the processing performed as part of a difference reduction operation. Image values which are altered as part of a difference reduction operation are included in the processed frame in place of the original input values. However, image values which are not altered by the processing will be included in the processed frame without alteration. Thus, despite processing to reduce differences between left and right eye images the number of luminance and/or chrominance values in the input image and processed output image generated by the processing which is performed will both normally include the same number of image values assuming the processing does not alter the size or shape of the frame.

The processed frame including left and right eye images generated by the described processing is normally subject to encoding and then storage, transmission and/or decoding and display. The stereoscopic images normally, and often do, correspond to real world scenes, e.g., sporting events, animal observations, parts of a movie being captured for movie generation purposes, etc.

The processing performed prior to encoding or as part of an encoding process can enhance compression, particularly in cases where difference encoding techniques are used, and/or reduce annoying differences between left and right eye images that may be perceived by a viewer and which do not contribute to the desired 3D effect in a significant and/or meaningful way.

While the same or similar types of thresholds may be used for making decisions whether to perform luminance and chrominance difference reduction operations, the maximum permitted chrominance difference reductions may be limited to being less than the permitted amount of luminance reduction to avoid introducing undesirable color distortions. For example changes in chrominance to reduce a chrominance difference may be limited to 20% or less than the maximum possible chrominance difference between left and right eye images while changes in luminance as part of a difference reduction operation may go as high as 50% of the maximum possible luminance difference between left and right eye images.

In some embodiments the processing performed in accordance with the invention is implemented in a precoder device, e.g., by a processor configured to implement the method of the invention, with the precoder being followed by an encoder as part of a stereoscopic encoding and distribution system. The precoder can be used with a wide variety of stereoscopic encoders.

In other embodiments the precoder functionality is incorporated directly into an encoder.

While thresholds used in accordance with the invention may be preconfigured and set, in other embodiments they are user configurable and can be altered by a user based on observed results, e.g., the quality of processed, encoded and then decoded and displayed stereoscopic images produced using the precoder of the invention. Different thresholds may be set for luminance and/or chrominance and the amount of luminance and/or chrominance different reduction to be performed as well as difference reduction information indicating the achieved disparity reduction on frames of a sequence. These thresholds and difference reduction information may be stored and made available to a user controlling an encoder and/or the precoder of the invention.

While various exemplary embodiments and features have been described, numerous additional features and embodiments are described in the detailed description which follows.

DETAILED DESCRIPTION

Figures 1, 1A, 1B, 1C:
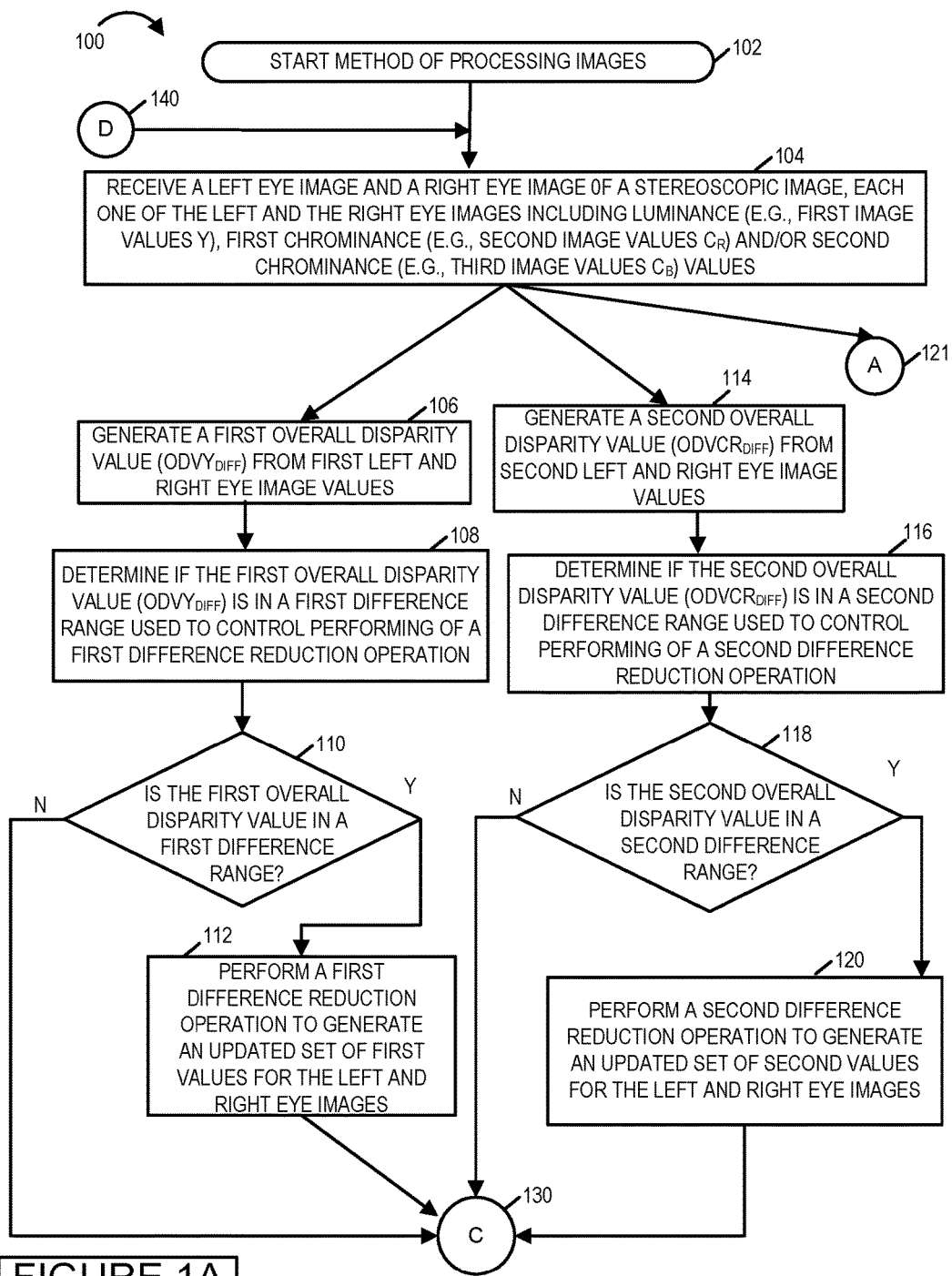
FIG. 1A which is a first part of FIG. 1 illustrates a first portion of an exemplary method for processing image data in accordance with one embodiment of the present invention.
FIG. 1B which is a second part of FIG. 1 illustrates a second portion of the exemplary method for processing image data in accordance with the embodiment of the present invention shown in FIG. 1A.
FIG. 1C which is a third part of FIG. 1 illustrates a third portion of the exemplary method for processing image data in accordance with the embodiment of the present invention shown in FIGS. 1A and 1B.
Figure 1B:
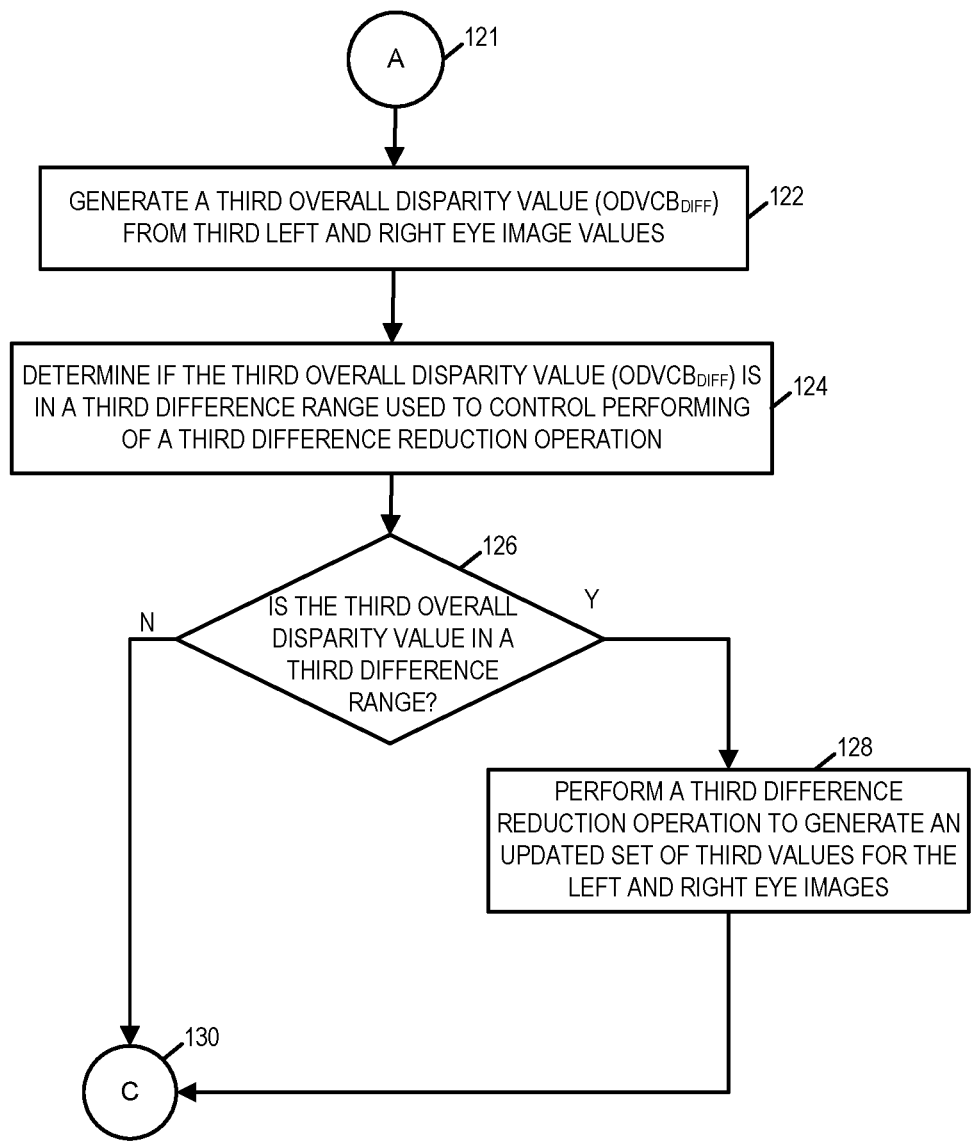
Figure 1C:
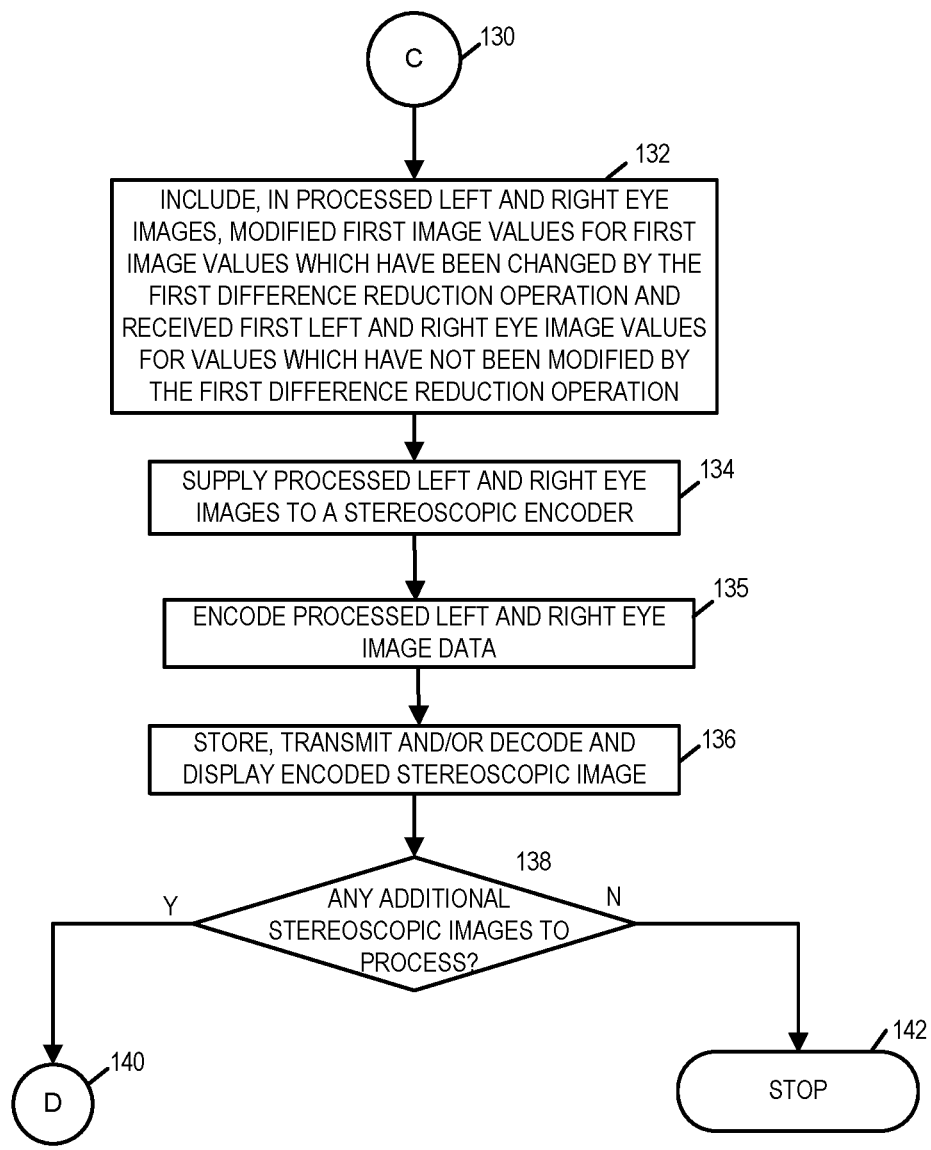

Differential stereoscopic encoders are sensitive to input quality, especially to disparity between eye views. This can reduce the encoder's robustness when input quality drops. Without mitigation, poor input quality could reduce live encoder efficiency. In some instances, the encoders could amplify differences in input content.

An exemplary process in accordance with the invention is designed to increase transmitted stereoscopic quality relative to other methods. This helps avoid lowered performance or the introduction of artifacts that may damage stereoscopic quality leading to unacceptable consequences of low encoded image quality in the encoded image and ultimately the 3D image generated by decoding the encoded image(s).

Various features discussed herein can be used to enhance a real-time stereoscopic encoder to maintain encoded stream quality when the quality of input stereoscopic material is poor, e.g., includes undesirable differences between left and right eye images corresponding to the same frame.

The methods and apparatus of the present invention are particularly useful when encoding live images where the amount of processing and/or the time available at an encoder for encoding stereoscopic images is limited. By reducing the difference between left and right eye views, the encoding process in many encoders can be simplified since there will be a greater match between left and right eye views allowing for simpler inter-image encoding, e.g., difference encoding and/or prediction based encoding, then would be possible with larger differences between the left and right eye images.

Live content often has defects, such as noise, sync drift, camera geometry disparity, lens flares, polarization disparity from beamsplitter mirrors, chromatic disparity, exposure disparity and switching artifacts, which may go uncorrected through the broadcast pipeline. The precoder of the present invention addresses and/or reduces at least some of the defects that may be created in a stereoscopic pair of images as the result of such devices.

Often, live camera outputs have severe differences in luminance caused by one camera in the beamsplitter rig recording glare, as a result of the polarizing effect of the beamsplitter mirror. In such cases, the resultant stereoscopic content, absent processing such as by a precoder of the present invention, is often uncomfortable to view because of the luminance disparity between the left and right eye images. Unfortunately, when the content is passed through a live encoder without mitigation, the problem can be compounded. The encoder often struggles to correct the disparity by iterating its feature-matching algorithm until it must abandon the effort and move to the next frame. With so few matches found between the features of the left and right eye input, the encoded result has lowered redundancy elimination than might be possible if more time and/or resources were available for encoding. This problem could be reduced by allowing the encoder more time to iterate the feature-matching process. Unfortunately, however, more time is not possible in a live encoding scenario and/or many other applications where time and/or processing resources are limited for cost or other reasons.

In addition to the diminished ability to compress the content effectively, destructive visual patterns can form in the encoded stream that correspond to the frequency of the alternating luminosity levels in the content. These patterns, in some cases, amplify the original defect in the content.

Various features described herein result in an enhancement and/or improvement to live stereoscopic (3d) encoders and/or other types of encoders. The difference reduction techniques are robust enough to provide improvements to periodic input quality fluctuations but also provide improvements in the case of infrequent or sudden differences between left and right eye images of a stereoscopic frame. The enhancement provided by the precoder of the invention can reduce and/or eliminate the destructive artifacts due to differences between left and right eye input images, without the need to increase encoder latency.

In some embodiments of the present invention the left and right eye image data is processed to reduce differences between the left and right eye images therein providing, in many cases, the advantage of increasing encoding efficiency when encoding the left and right eye images. This is particularly the case when using a differential encoder and/or another encoder which encodes one of the left and right eye images based on the content of the other one of the left and right eye images. In addition to providing improved encoding efficiency in at least some embodiments the difference reduction techniques improve perceived decoded image quality by reducing differences in the left and right eye images which may be due to reflections and/or saturation of the input sensor of one of the eye images and/or other image capture related problems.

Various features are directed to Stereoscopic Aware Spectral Equalization (SASE) of images as part of a stereoscopic image encoding process.

Figure 5:
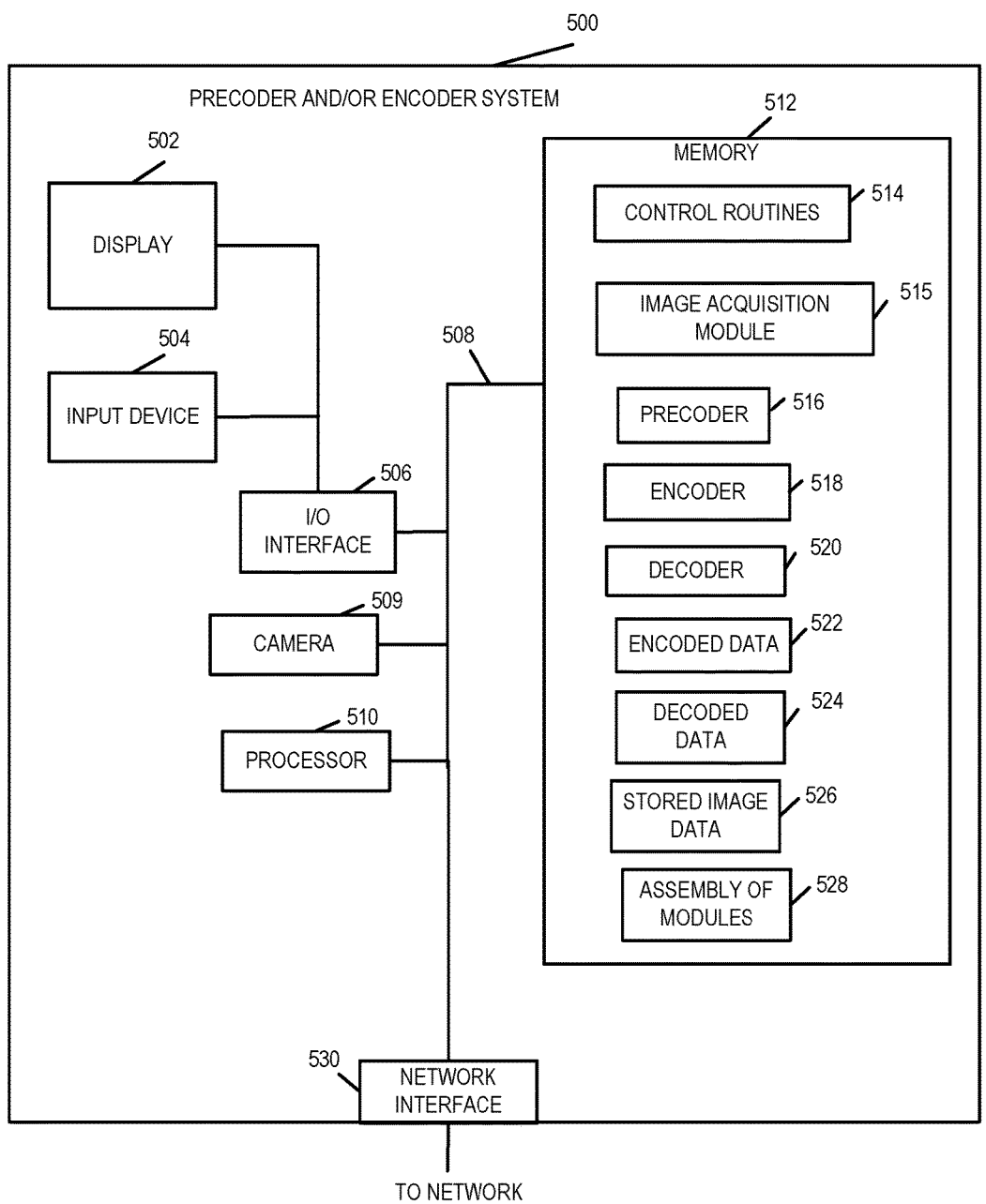
FIG. 5 illustrates an exemplary apparatus in accordance with one embodiment of the present invention.

FIG. 1 illustrates image processing in accordance with the invention that can, and in some embodiments is, performed by the system shown in FIG. 5.

FIG. 1 illustrates a method which can, and in some embodiments is, used to perform stereoscopic image equalization, e.g., as part of a stereoscopic image pre-coding operation or as part of a stereoscopic image encoding operation. The method reduces and/or avoids imbalances, e.g., luminance and/or chrominance imbalances between the left and right eye images of an image pair representing a stereoscopic frame. The method can reduce encoding artifacts that might result if the left and right eye images of a stereoscopic image are encoded without such processing and/or may increase encoder efficiency and/or reduce the processing time required to encode the input image data.

For purposes of explaining the invention it will be assumed that the precoder 500 of FIG. 5 implements the method. However, the method may and in some embodiments is, implemented by the precoder 804 shown in FIG. 8.

The method 100 shown in FIG. 1 begins in step 102 with the method beginning to be executed by processor 510 of the precoder 500. Operation proceeds from start step 102 to receive step 104 in which the precoder 500 receives the image data to be processed, e.g., first, second and third sets of image values corresponding to a left eye image and a right eye image. The first, second and third set of image values may include, e.g., luminance (Y) pixel values, first chrominance ($C_R$) values, and second chrominance ($C_B$) values respectively. In cases where only one set of values, e.g., luminance values, are to be processed the sets of chrominance values would not be processed by the precoder and if received would simply be passed through and/or incorporated into the set of processed frame data without alteration. As should be appreciated the sets of chrominance data while corresponding to the same frame as the luminance data may, but need not be, at a lower resolution than the luminance data. Accordingly, at least in some embodiments each of the first and second sets of chrominance data, for the left and right eye images of a frame, include fewer image values than each set of luminance data for the left and right eye images of the same frame. The resolution of the input data is not critical to the invention.

Operation proceeds from step 104 along three paths which may be implemented in parallel or sequentially with each path corresponding to one of the three different sets of input data, e.g., luminance Y, chrominance $C_R$ and chrominance $C_B$. The processing performed on each of the three different paths is similar.

Figure 2:
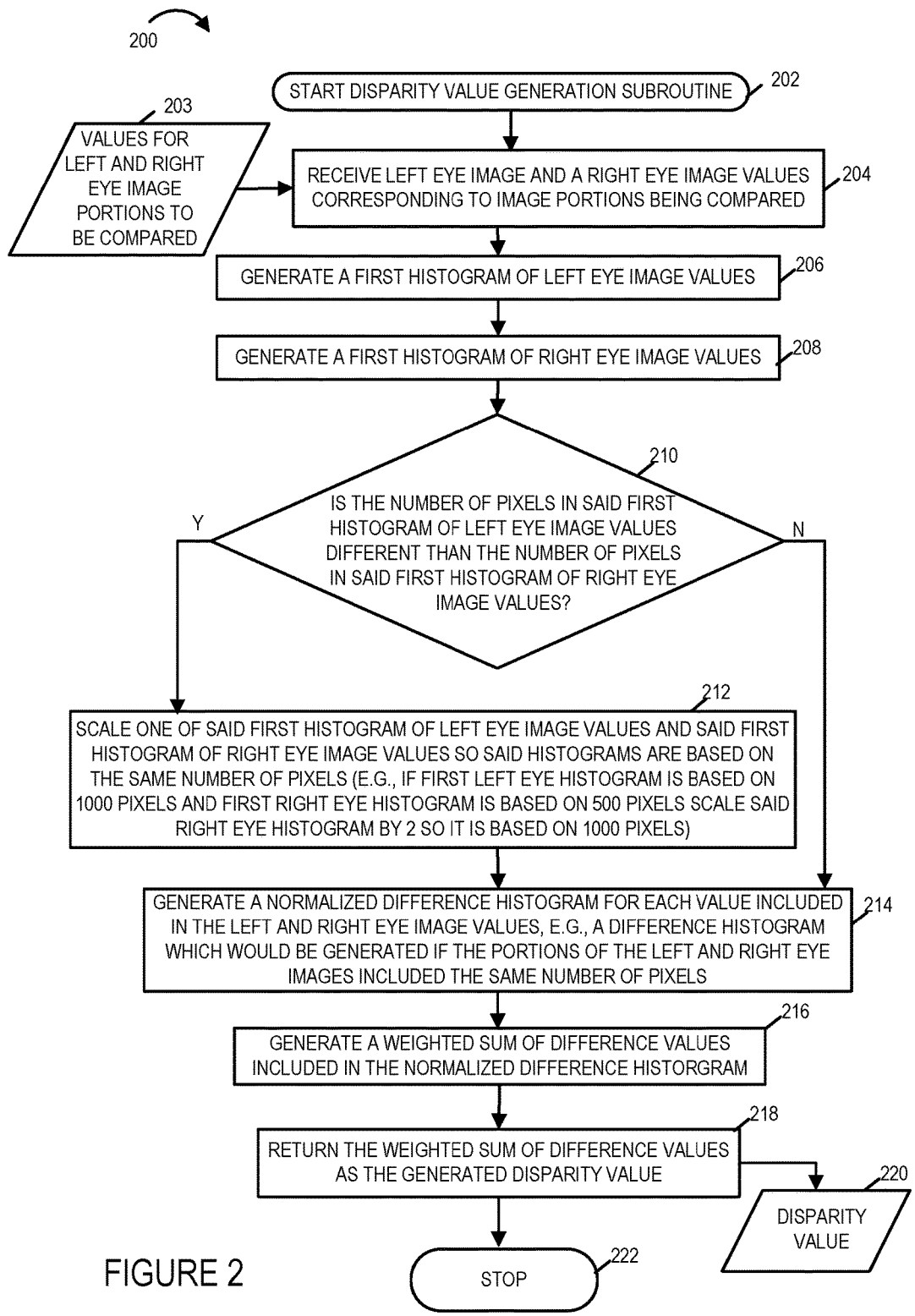
FIG. 2 illustrates an exemplary subroutine for generating a disparity value in accordance with one embodiment of the present invention.

The luminance processing path from step 104 begins in step 106 in which a first overall disparity value for luminance ($ODVY_{DIFF}$) is generated from the luminance data corresponding to the left and right eye image values corresponding to the stereoscopic frame being processed. Step 106 may, and normally does, involve a call to a disparity value generation subroutine such as the disparity value generation subroutine 200 shown in FIG. 2.

Figure 6:
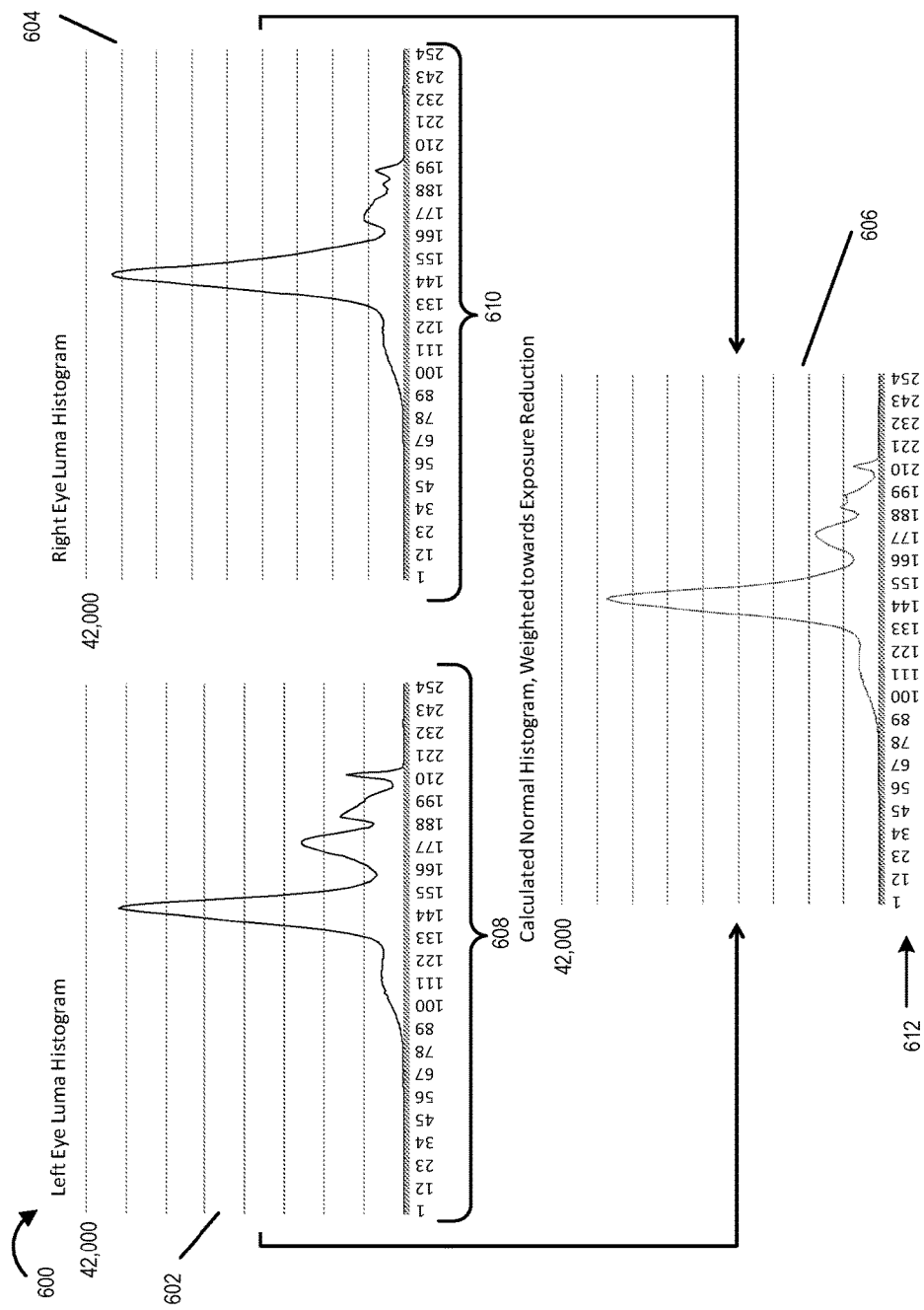
FIG. 6 illustrates exemplary left eye image luma histogram, right eye image luma histogram and an exemplary normalized histogram weighted towards luminance reduction, e.g., exposure reduction, generated from said left and right eye image luma histograms.

The disparity value generation subroutine 200 will now be discussed briefly to facilitate understanding of the overall method. The disparity value generation subroutine 200 is started, e.g., in response to a call from the main routine 100 which triggers execution of the subroutine 200 e.g., by a precoder or hardware in the precoder 500. In step 204, the image values 203 for the left and right eye image portions which are to be used in generating the disparity value are received. In the case where the image portions which are to be used is the entire frame, e.g., to generate an overall disparity value for the frame, the full set of left and right eye image values for the type of data, e.g., luminance data, which is being processed will be received. With the image values for the left and right eye having been received, operation proceeds to step 206 in which a first histogram is generated from the left eye image values being processed, e.g., the values for the left eye image portions received in step 204. The histogram is a set of counts where each count corresponds to a different possible pixel value. The count for a pixel value indicates the number of pixels in the image portion having the pixel value. For example, a count of 10 for the pixel value 254 would indicate that there are 10 pixel values with the value 254 in the left eye image portion being processed. Each count may, and in some embodiments is, stored in a memory location referred to sometimes as a "bin" or "bucket". FIG. 6 is an illustration 600 which include a diagram 602 that shows an exemplary left eye histogram where axis 608 shows possible pixel values and the vertical axis of diagram 602 corresponds to numbers of pixels. In the FIG. 6 example, the total number pixel values in the set of luminance data for each of the left and right eye images is 921,600. The horizontal axis has a maximum pixel count of 42,000 with the horizontal lines being used to provide an indication of various pixel count level with the highest line corresponding to a 42,000 pixel count level. While the numbers shown on the horizontal scale range from 1 to 254 the actual range is from 0 to 255 with the text indicating 0 and 255 being omitted for space reasons.

From step 206 operation proceeds to step 208 in which a first histogram of right eye image values is generated for the portion of the right eye image being processed. Diagram 604 of FIG. 6 shows an exemplary right eye histogram which is similar but not identical in shape to the left eye image histogram 602 for the frame to which the FIG. 6 example corresponds. While steps 206 and 208 are shown as sequential steps they can be performed in parallel.

In the FIG. 6 example it can be seen that the left eye image of the exemplary frame includes relatively few pixels having the values 1 and 254 but a large number of pixels having the value 144.

In addition to the left and right eye histograms 602 and 604. FIG. 6 shows a calculated normalized histogram 606 with pixel values ranging from 0-255 along the horizontal axis 612. Histogram 606 is shown for purposes of explaining the invention and, at least in some embodiments, need not be calculated as part of the method. The histogram 606 represents the histogram that would result if a single histogram, were generated from the full set of left and right eye luminance values and the total number of pixels in the histogram was the same as that for a single eye view histogram. Since the total number of pixels would be twice that of the individual histograms, the counts generated by considering all the pixel values in the left and right eye images is normalized to generate histogram 606 by scaling the counts in the histogram by a factor of 0.5 to make it easier to compare the histogram 606 to histograms 608, 610. As should be expected the histogram 606 has a shape somewhat between that of the left and right eye histograms 608, 610. To reduce the difference between the left and right eye histograms, it may be useful to alter pixel values in at least one and/or both of the left and right eye images to make the histograms of the modified left and right eye images more closely match. In the case where modifications are made to both the left and right eye image values, each of image values for the left and right eyes are changed, in some embodiments, so that the distribution of values more closely approaches that of the histogram 606.

Referring once again to FIG. 2, operation proceeds to step 210 where a check is made to determine if the number of pixels in the first histogram of left eye image values is different than the number of pixels in the first histogram of right eye image values. In the case where the portion being processed corresponds to the entire frame the left and right eye image portions will normally include the same number of pixel values. However, when a portion of the image being processed has been identified based on a depth map or another technique, the number of pixels in the image region being processed may be different for the left and right eye portions. For example one of the left and right eye images may include a larger foreground image portion than the other one resulting in the number of image values being different for the foreground region when the number in the left eye is compared to the number in the right eye.

If the number of image values in the left and right eye image portions used to generate the histograms in step 206 and 208 are the same, operation will proceed from step 210 to step 214. However, if the number of image values in the histograms is different operation will proceed from step 210 to scaling step 212. In scaling step 212 one of the first histogram of the left eye image values or the first histogram of the right eye image values is scaled so that the resulting histograms are based on the same number of pixels. For example if the first left eye histogram is based on 1000 pixels and the right eye histogram is based on 500 pixels the right eye histogram is scaled in some embodiments by 2 so that it is based on 1000 pixels. Alternatively the counts in the first left eye histogram could be scaled, e.g., multiplied by ½, so that the histograms to be compared are based on a count of 500 image values.

Operation proceeds from step 212, when used, to step 214. Thus, in step 214 the histograms being used in step 214 are normalized histograms, e.g., left and right eye histograms based on histograms including the same number of image values. In step 214 a difference histogram is generated. Generation of a difference histogram may include subtracting, on a per bin basis, pixel value counts corresponding to the right eye image from pixel value counts corresponding to the left eye image. This difference determination process generates a difference value for each bin, e.g., possible pixel value. The set of difference values represents the difference histogram for the normalized left and right eye image histograms for the region of the image being processed, e.g., entire frame, foreground region, middle ground region or background region.

Operation proceeds from difference histogram generation step 214 to difference value generation step 216. In step 216 a weighted sum of difference values is generated by weighting the individual difference values included in the difference histogram generated in step 214 and summing the weighted values to generate a disparity value. In some embodiments the weighting is a simple weighting based on the image value bin to which the difference value corresponds. Assume for example that the bin corresponding to pixel value 5 shows a difference of 20 pixels between the left and right eye images while the bin corresponding to pixel value 254 shows a difference of 1 pixel between the left and right eye images. The weighted sum would include the following contribution of 100 (20×5) from bin 5 and a contribution of 254 (1×254) from bin 254. Contributions from the other bins of the difference histogram would be summed with these contributions to generate the overall disparity value in one embodiment. Note that such a weighting approach reflects the fact that the pixel value corresponding to bin 254 will contribute much more significantly to the overall luminance or chrominance of the region, depending on which type of images are being processed, than the pixel value corresponding to bin 5.

After generation of the weighted sum of difference values in step 216, the generated weighted sum of difference values is returned in step 218 as the disparity value generated by the step which called the subroutine 200. For example, if subroutine 200 was called from step 106 the returned disparity value would be the overall disparity value (ODVY$_{DIFF}$). If subroutine routine 200 was called by step 116 an overall chrominance disparity value would be returned. Subroutine 200 may be called when processing regions of the frame which do not include the entire frame, e.g., a foreground region. In such a case the returned disparity value would be indicative of the difference between the left and right eye foreground regions with the type of data to which the disparity value applied depending on whether it was generated from luminance data or one of the sets of chrominance data.

Operation proceeds from step 106 to step 108 in which the disparity value generated in step 106 is checked to determine if it is in a first difference range used to control performing of a first difference reduction operation, e.g., a luminance difference reduction operation used to reduce the difference between the left and right eye image luminance histograms. Step 108 may, and in some embodiments is, implemented by a call to subroutine 300 shown in FIG. 3. The range may, in the case of luminance image values, have a lower threshold of 20% of the maximum possible difference between the overall luminance of the left and right eye images and an upper threshold of 70% of the maximum possible luminance difference between the left and right eye images. However other thresholds are possible. Values outside this range may indicate some form of error and trying to make the left and right eye images similar may create more artifacts and/or degrade image quality. The indicated ranges are exemplary and a user controlling the encoding process can alter the range by changing one or more thresholds, e.g., based on the observed quality of images produced by encoding and then decoding and displaying the processed images.

If in detection step 110 the first overall disparity value is in the first difference range, a disparity reduction operation is triggered by proceeding from detection step 110 to step 112 wherein a first difference reduction operation is performed to generate an updated set of first values for the left and right eye images. The updated sets of left and right eye image values may include one or more luminance values which have been altered to reduce the difference between the sets of left and right eye image luminance values. Step 112 may be implemented by a call to a difference reduction subroutine such as that shown in FIG. 4 and which will be described below.

From step 112 operation proceeds via connecting node 130 to step 132 of FIG. 1C. Operation proceeds directly from step 110 via connecting node 130 to step 132 if in step 110 it is determined that the first overall disparity value is not in the range which triggers performing a disparity reduction operation.

Steps 106, 108, 110 and 112 correspond to the processing path corresponding to first image values, e.g., luminance image values. Steps 114, 116, 118 and 120 which correspond to the processing of the second set of image values, e.g., left and right eye image chrominance values, involve operations which are similar to those previously described with regard to luminance processing in step 106, 108, 110 and 112, respectively.

In step 114 a second overall disparity value (ODVCR$_{Diff}$) is generated from the Cr (red chrominance) values corresponding to the left and right eye images of the frame being processed. This may be done by making a call to the disparity value generation subroutine 200 and supplying the Cr values for the frame being processed.

Operation proceeds from step 114 to step 116 in which a determination is made as to whether or not the second overall disparity value generated in step 114 is within a second difference range used to trigger performing a chrominance disparity reduction operation. The lower and upper limits of the range may, as in the case of the luminance processing be, e.g., 20% and 70% but with the percentages being in regard to the maximum possible (Cr) chrominance difference between the left and right eye images of a frame being processed.

In step 116 the second overall disparity value is checked to determine if it is in the range that causes image processing to proceed to difference reduction step 120. This check may be performed by making a call to subroutine 300 shown in FIG. 3. Operation then proceeds to decision step 118. If it is determined that the second overall disparity value is in the range which triggers a second difference reduction operation, operation proceeds from step 118 to step 120. In step 130 a difference reduction operation is performed, e.g., by a call to difference reduction subroutine 400. However, if in step 118 the second overall disparity value is not in the second difference range used to trigger a disparity reduction operation, operation proceeds from step 118 to step 132 shown in FIG. 1C via connecting node C 130. In step 120 a difference reduction operation is performed, e.g., via a call the difference reduction subroutine 400.

The processing of the third set of image values, e.g., a second set of chrominance values (C$_B$) corresponding to the color blue, is similar to the processing of the first set of chrominance values except with the Cb values being used instead of the Cr values. The processing of the second set of chrominance values proceeds from step 104 via connecting node 121 to step 122 and includes steps 122, 124, 126 and 128 which are the same or similar to previously described steps 114, 116, 118 and 120, respectively, but with different chrominance values being processed and possibly different thresholds and/or amounts of difference reduction begin performed. Given the similarity in the processing of the two sets of chrominance values the processing with regard to the second set of chrominance values will not be discussed further.

FIG. 1C shows the steps associated with producing an output set of left and right eye image data reflecting the result of any difference reduction operations performed to the first, second and third sets of image data, e.g., luminance, Cr and $C_B$ data. In step 132 a set of data representating processed left and right eye images corresponding to the frame being processed is generated. In the processed sets of left and right eye image data to be output, modified image values which were the result of altering input image values are included in the output data set for values which were altered. Image values which were not altered are included in their unaltered form in the set of processed left and right eye image data generated by the precoding method. Thus, an output frame corresponding to an input frame will normally include the same number of pixel, e.g., image, values as the input frame but with some of the values having been altered from the input values as part of a difference reduction operation. It should be appreciated that when difference reduction operations are not performed on the second and third sets of image values, these sets will be output unchanged, e.g., simply passed through the precoder.

Processed images representing a frame are supplied in step 134 to an encoder which then encodes the left and right eye images. A stereoscopic image encoder which uses differential and/or predictive coding to code the left and right eye images of a frame may be used as the encoder. In step 135 the encoder is operated to encode the processed left and right eye image data supplied to it. Then in step 136 the encoded image data generated by the stereoscopic encoder is stored, transmitted and/or decoded and displayed. A system administrator overseeing the encoding process may, and in some embodiments does, alter one or more thresholds and/or the amount of difference reduction performed by the precoder based on the perceived quality of images generated from the encoded image data as a program or event being photographed and encoded is still on-going.

The process shown in FIG. 1 is an ongoing process allowing a sequence of frames to be processed, encoded and transmitted. This is reflected in step 138 where a check is made as to whether there are any more frames, e.g., from the stereoscopic camera, to be processed. If the answer to step 138 is yes, e.g., because the event being photographed is still ongoing, operation precedes via connecting node D 140 back to step 104 wherein the next frame to be processed is received. However if the determination in step 138 indicates that there are no more frames to process, operation proceeds from step 138 to stop step 142.

Applied to at least some test content, the difference reduction operations and related processing shown in FIG. 1, dramatically reduces input differentials that would otherwise cause deleterious results in the final decoded image that may have occurred absent the use of such difference reduction processing.

Benefits of processing input frames in the manner shown in FIG. 1 may include overall encoder efficiency improvements allowing for stereoscopic frames to be encoded at very low-bitrates. This is due to the fact that feature-matching is often highly-critical to successful redundancy elimination at low target bit rates (e.g. 2 Mbps) and the difference reduction performed in the described embodiment enhances similarity and thus feature matching between frames.

The described method may also improve the visual quality of poor, e.g., low quality input content which may be expected in real time encoding situations, e.g., live sporting events and/or other situations where studio quality control over the image capture process is not possible or is lacking.

In at least some embodiments the precoding and encoding methods are used as part of a diagnostic process as part of a stereoscopic content production process. In at least one such embodiment the precoder and encoding process described herein is used to produce a real-time measure of production stereo quality that is then used diagnostically in the production environment to facilitate camera set up, lighting changes and/or other changes without having to wait for normal post production processing of the captured images to determine the effect of various changes or settings on the production process.

FIG. 1 illustrates image processing in accordance with the invention that can, and in some embodiments is, performed by the system shown in FIG. 5. The processing can also be performed by the apparatus 804 shown in FIG. 8.

Figure 3:
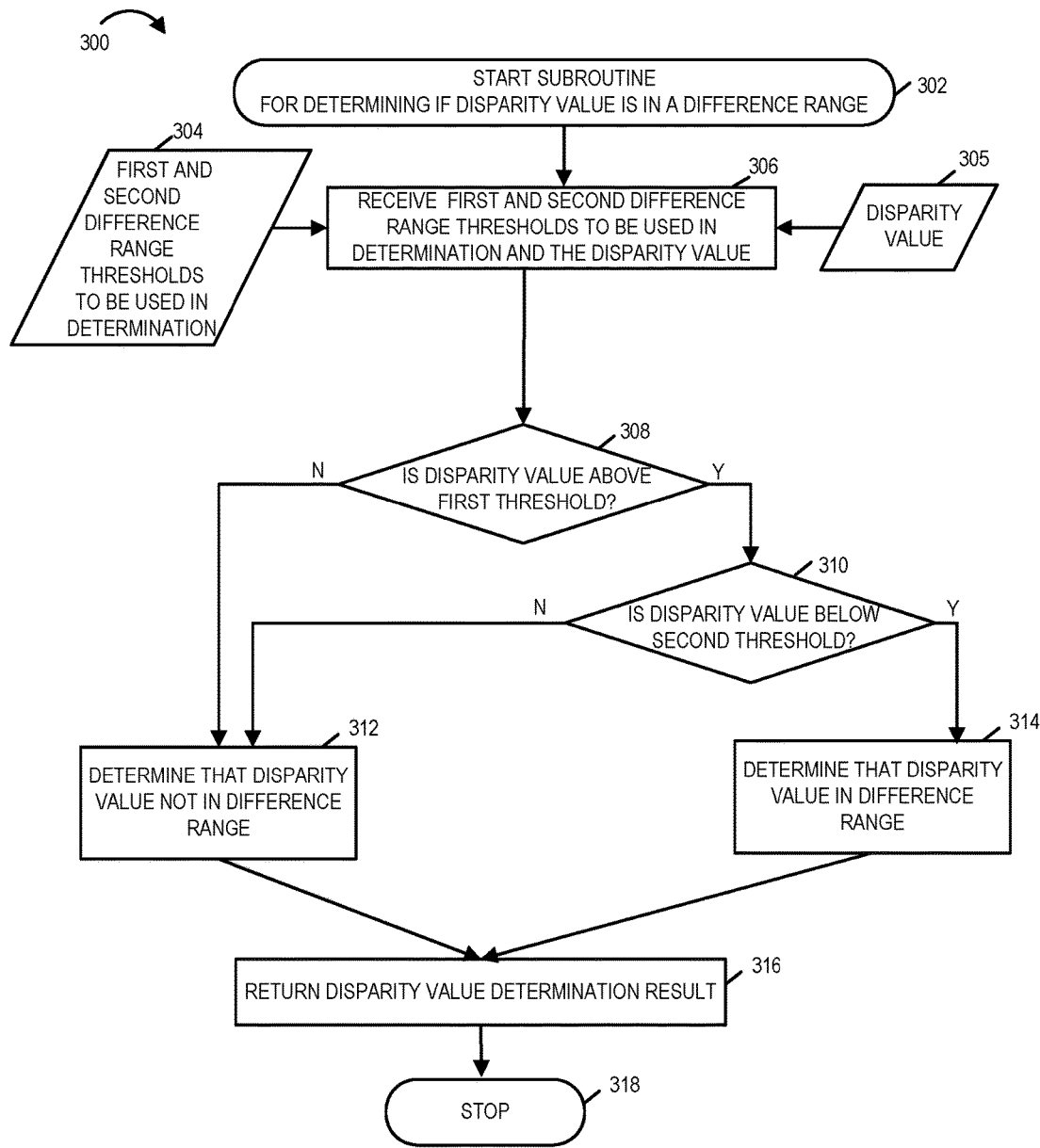
FIG. 3 illustrates an exemplary subroutine for determining if a disparity value is in a difference range used to trigger a difference reduction operation in accordance with one embodiment of the present invention.

FIG. 3 illustrates an exemplary subroutine 300 for determining if a disparity value is in a difference range. Subroutine 300 may be, and in some embodiments of the present invention is, used for implementing steps 108, 116, and 124 of method 100 of FIG. 1. For explanatory purposes, subroutine 300 will be explained as being implemented on the exemplary precoder system 500 of FIG. 5. The subroutine 300 starts at start step 302 with subroutine 300 being executed on processor 510 from which execution proceeds to step 306.

In step 306, first and second difference range thresholds to be used in the determination 304 are received for example from a user, e.g., administrator, via input device 504. In this exemplary embodiment, the first difference range threshold being lower in value than the second difference range threshold. In some embodiments the first, lower threshold is 20% of the maximum possible disparity between the left eye image and the right eye image (e.g., when implementing subroutine 108, 20% of the maximum possible luminance difference between the left eye image and the right eye image). In at least some embodiments, the second, upper threshold is 70% of the maximum possible disparity between the left eye image and the right eye image (e.g., when implementing subroutine 108, 70% of the maximum possible luminance disparity between the left eye image and the right eye image).

In some embodiments, the first and second difference range thresholds may be, and are, received from a user during initialization of the precoder system 502 with the thresholds being stored in memory 512. In at least some of such embodiments, the processor 510 receives the thresholds from memory 512.

In step 306 the disparity value 305 which the subroutine 300 will determine whether it is in the difference range defined by the first and second difference range thresholds is also received. In the case of the disparity value being of type, luminance the disparity value may be the first overall disparity value ($ODVY_{DIFF}$) generated in step 106 of method 100 from the first left and right eye image values received in step 104. In the case of the disparity value being of type chrominance, the disparity value may be the second overall disparity value ($ODVCR_{DIFF}$) generated in step 114 from the second left and right eye image values received in step 104 or the disparity value may be the third overall disparity value ($ODVCB_{DIFF}$) generated in step 122 from the third left and right eye image values received in step 104. In some embodiments, the luminance and chrominance disparity values of steps 106, 114, and 122 are generated using exemplary subroutine 200 with each of the luminance and chrominance disparity values being outputted in step 218 of the subroutine as disparity value 220 which may be, and in some embodiments is stored in memory 512 with information associating the disparity value with it type and its associated image values.

Processing proceeds from receiving step 306 to comparison step 308. In step comparison step 308 the disparity value 305, e.g., first overall disparity value ($ODVY_{DIFF}$) received in step 306 is compared to the first, lower difference range threshold, e.g., 20% of the maximum possible luminance disparity between the left eye image and the right eye image. If the disparity value is above first, lower difference threshold than processing proceeds to step 310. Other processing proceeds to step determination step 312. In decision step 310, the disparity value 305 received in step 306 is compared to the second difference range threshold received in step 306. If the disparity value 305 is below the second difference range threshold than processing to determination step 314. Otherwise processing proceeds to determination step 312.

In determination step 312, it is determined that the disparity value 305 received in step 306 is not within the difference range specified by the first and second difference range thresholds 304 received in step 306. Processing then proceeds to return step 316 where the disparity value determination result that the disparity value is not in the difference range is returned to the routine and/or method that invoked subroutine 300. Processing then proceeds to stop step 318 where processing in connection with subroutine 300 concludes but processing in the system for example, processing in connection with the returned determination result continues. The determination result may be, and in some embodiments is, stored in memory 512 for potential later use before processing concludes in connection with subroutine 300 at step 318.

In determination step 314, it is determined that the disparity value 305 received in step 306 is within the difference range specified by the first and second difference range thresholds 304 received in step 306. Processing then proceeds to return step 316 where the disparity value determination result that the disparity value is in the difference range is returned to the routine and/or method that invoked subroutine 300. Processing then proceeds to stop step 318 where as discussed above processing in connection with subroutine 300 concludes but processing in the system for example, processing in connection with the returned determination result continues. The determination result may be, and in some embodiments is, stored in memory 512 for potential later use before processing concludes in connection with subroutine 300 at step 318. By way of example, if the received disparity value is a luminance disparity value ($ODVY_{DIFF}$) that is 60% of the maximum potential luminance disparity between the left and right eye images and the received first lower difference threshold was 20% of the maximum potential luminance disparity between the left and right eye images and the received second difference threshold value was 70% of the maximum potential luminance disparity between the left and right eye images than routine 300 would determine and return the result that the received disparity value was within the difference range. If however, the disparity difference value received was for example 10% of the maximum potential luminance disparity between the left and right eye images then routine 300 would determine and return the result that the disparity value of 10% is not in the difference range. While the above example has been explained mostly in connection with luminance disparity values it is also applicable to chrominance disparity values e.g., $ODVCR_{DIFF}$ and $ODVCB_{DIFF}$.

Figure 4:
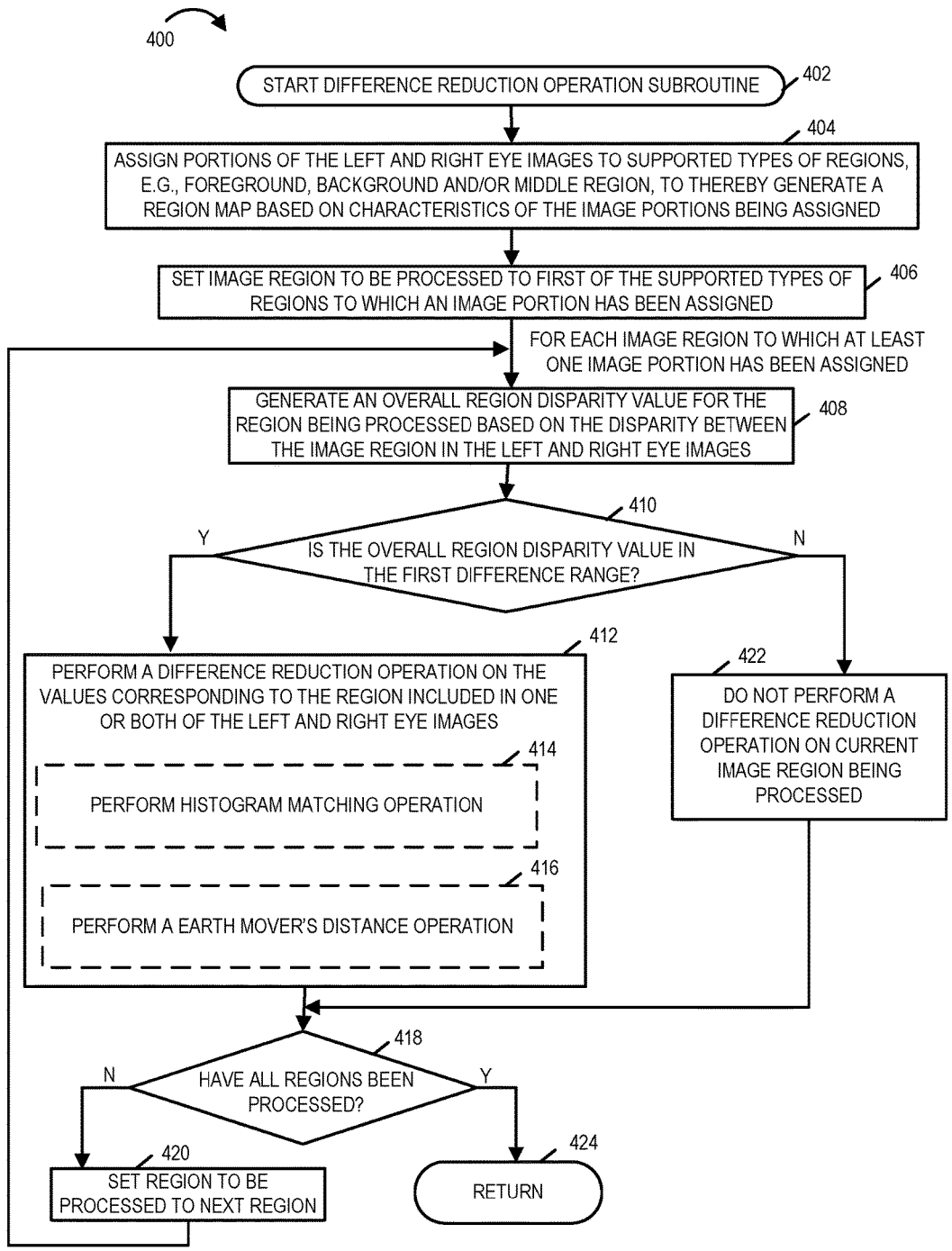
FIG. 4 illustrates an exemplary difference reduction operation subroutine in accordance with one embodiment of the present invention.

FIG. 4 illustrates an exemplary subroutine 400 for performing a difference reduction operation on one or more regions of either the left and/or right eye images of a frame. Subroutine 400 may be, and in some embodiments of the present invention is, used for implementing steps 112, 120, and 128 of method 100 of FIG. 1. For explanatory purposes, subroutine 400 will be explained as being implemented on the exemplary precoder system 500 of FIG. 5. The subroutine 400 starts at start step 402 with subroutine 400 being executed on processor 510 from which execution proceeds to step 404. In step 404, portions of the left and right eye images are assigned to supported types of regions, e.g., foreground, background and/or middle ground region to thereby generate a region map based on characteristics of the image portions being assigned. For example the region maps may be depth maps wherein the characteristics of the image are the depth (foreground, background, middle ground). A discussion of stereo correspondence and depth mapping can be found at the following Internet website: http://blog.martinperis.com/2011/08/opencv-stereo-matching.html. In at least some embodiments all portions of the left and right eye images are assigned to a single region which encompasses the entire image in such a case the entire left and right eye images are processed as a single region. However, in most embodiments multiple regions, often 3 or more, are supported with image values being assigned to various regions, e.g., with each image value being assigned to one of the regions. Processing proceeds to step 406 wherein the image region to be processed is set to the first of the supported types of regions to which an image portion has been assigned, e.g., foreground region. Processing proceeds to step 408.

In step 408, an overall region disparity value for the region being processed based on the disparity between the image region in the left and right eye images is generated. For example, if the foreground region is being processed and the disparity value is being generated from luminance image values, a disparity value, e.g., luminance disparity value, is generated for the pixel luminance values assigned to the foreground regions of the right and left eye images. Step 408 may be implemented by a call to the subroutine 200 of FIG. 2. Processing proceeds from step 408 to decision step 410.

In decision step 410, the overall region disparity value is evaluated to determine whether it is within the first difference range. The first difference range may be the same as the difference range discussed in connection with subroutine 300 of FIG. 3. If the overall region disparity value is in the first difference range then processing proceeds to step 412. Otherwise processing proceeds to step 422.

In step 422, it is determined that the system will not perform a difference reduction operation on the current image region being processed, e.g., the foreground region because the overall disparity value is not within the first difference range.

In step 412, a difference reduction operation is performed on the values corresponding to the region included in one or both of the left and right eye images. In some embodiments, step 412 includes the optional step 414 and/or optional step 416. In optional step 414 a histogram matching operation is performed as part of the difference reduction operation of step 412. Histogram matching operations for difference reduction in image processing is known in the art. For example, a discussion of histogram matching can be found on the Internet at the following website: http://en.wikipedia.org/wiki/Histogram_matching. In optional step 416 an earth mover's distance operation is performed as part of the difference reduction operation of step 412. Earth mover's distance operation for difference reduction is also known in the art. For example, a discussion of the earth mover's distance operation is discussed at the following website: http://en.wikipedia.org/wiki/Earth_Move%27s_Distance. While both the histogram matching operation and earth mover's distance operation may be used in the difference reduction operation, typically only one of the two operations is performed as part of the difference reduction operation.

Figure 7:
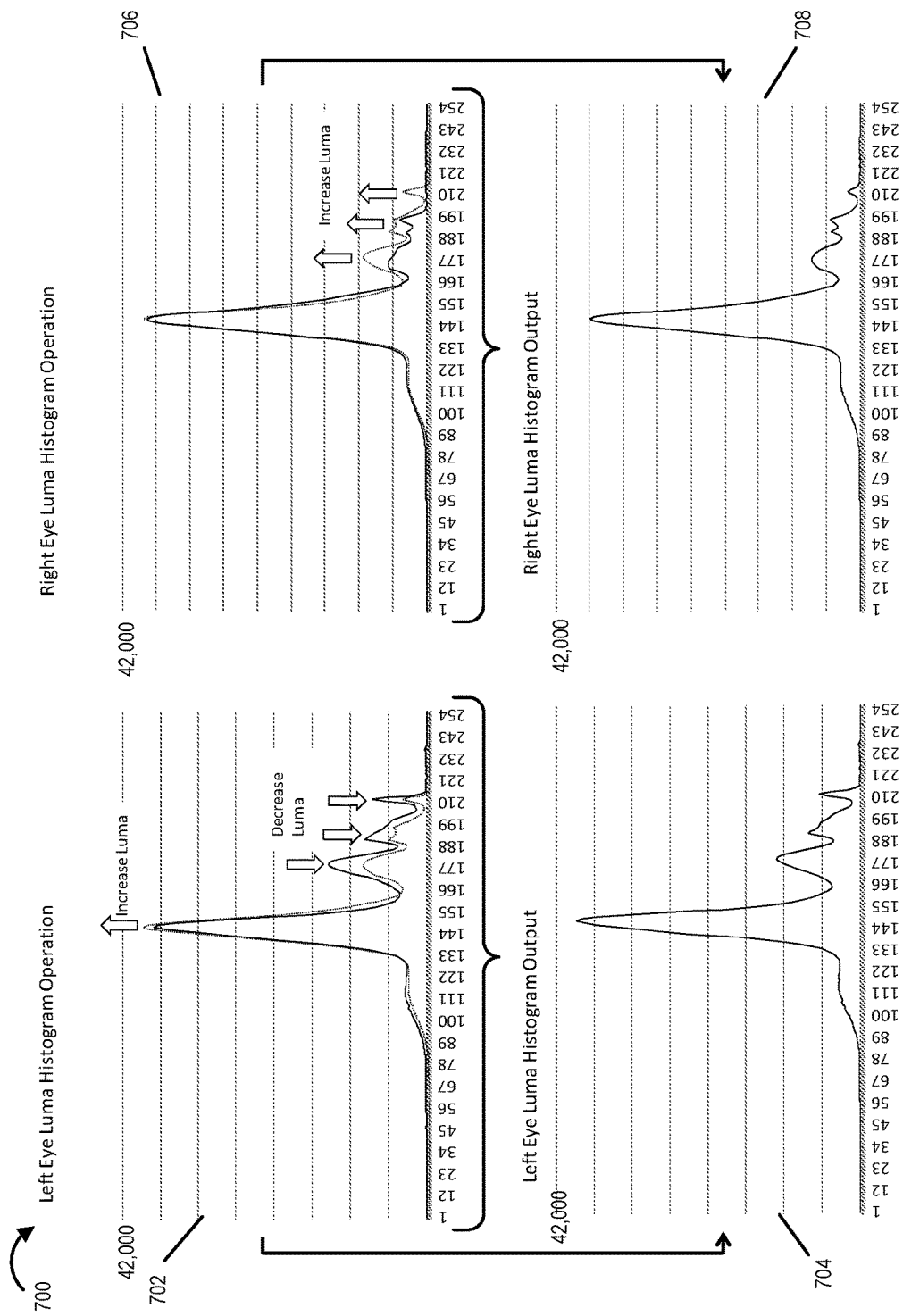
FIG. 7 illustrates exemplary left eye image luma histogram operation, right eye image luma histogram operation, an exemplary left eye luma histogram output, and an exemplary right eye luma histogram output.

FIG. 7 is a diagram 700 which shows how the left and right eye luminance histograms shown in FIG. 6 can be modified to reduce the difference between the histograms. In the FIGS. 6 and 7 examples the left and right eye images are of a resolution (1280×720) which results in 921,600 luminance values for each of the left and right eye images.

The difference histogram for the exemplary left and right eye images is determined from a per bin comparison of the counts in the left and right eye histograms. Such a comparison gives us the number of pixels which are different. There are 38.84% of the pixels between the left and right eye images which are different (357,960/921,600 total pixels). 38.84% is a straight forward percentage of pixels that are not in the same buckets. When the count of the number of pixels that are in a different bin are weighted by the bin's corresponding luminance value this gives a weighted difference of 60/146,935. The maximum weighted difference is, in this example 921,600*255=235,000,800. Which gives us a weighted difference of 25.59%. Since the difference of 25.59% is in the 20% to 70% range used to trigger a difference reduction operation in some embodiments, a luminance difference reduction operation will be triggered in the FIG. 7 example.

Diagrams 702 and 706 are illustrations showing the actual histograms for the left and right eye images, respectively, using dark solid lines to shown the actual histogram and a lighter dotted line to show the shape of the histogram if the values of the two histograms were combined and there was no difference between the histograms as shown in diagram 606.

Arrows are used in diagrams 702 and 706 to show where luminance image values should be increased and decreased to reduce the difference between the left and right eye luminance histograms and thus the overall luminance difference between the left and right eye images. Diagrams 704, 708 show the histograms of processed left and right eye images after the difference reduction operation is performed. Note that while the histograms shown in diagrams 704 and 708 are not identical they are much closer in overall shape than the histograms shown in diagrams 702, 706 which corresponded to the input image being processed.

While FIG. 7 is an example of processing and reducing the luminance difference between left and right eye images of a frame where the processing is performed on a region which is the size of the entire frame, the same kind of processing can be performed on other size regions, e.g., foreground, middle and background regions when portions of images corresponding to a frame are assigned to such regions and where the implemented embodiment performs difference reductions on a per region basis with the images including multiple regions. Also note while explained in the context of luminance values the difference reduction operation would be the same or similar when applied to chrominance reduction operations. However the maxim amount of change in image values in the case of chrominance reduction may be, and sometimes is, less than the amount of difference reduction applied to luminance values. The use of different amounts of difference reduction to color and luminance data can avoid undesirable color changes which may be perceivable to an end user during playback.

Processing proceeds from steps 412 and 422 to decision step 418. In decision step 418, a determination is made as to whether each image region to which at least one image portion has been assigned has been processed. If all regions have been processed then processing proceeds to return step 424 wherein processing in connection with subroutine 400 is concluded as processing returns the routine or method that invoked subroutine 400. If all regions have not been processed then processing proceeds from step 418 to step 420 where the processor 510 sets to the region to be processed to the next region and processing proceeds back to step 408 wherein processing continues as previously described but this time in connection with the next region.

FIG. 5 illustrates a precoder and/or encoder system 500 implemented in accordance with some exemplary embodiments of the present invention. The system 500 includes a display 502, input device 504, input/output (I/O) interface 506, a camera 509, e.g., a stereoscopic camera, a processor 510, network interface 530 and a memory 512 which are coupled together by bus 508. The memory 512 includes various modules, e.g., routines, which when executed by the processor 510 control the precoder and/or encoder system 500 to implement the precoding and/or encoding methods which have been described. In some embodiments the system 500 implements the routines and subroutines 100, 200, 300 and 400.

The memory 512 includes routines 514 and various modules including an image acquisition module 515, a precoder 516, an encoder 518, and a decoder 520. The memory 512 further includes encoded data 522 which is an output of the encoder 518, decoded data 524 which is an output of the decoder 520. In some embodiments the memory further includes an assembly of modules 528 which may be, and in some embodiments is implemented as part of the precoder 516.

Routines 514 include communications routines and/or control routines.

The processor 510, e.g., a CPU, executes routines 514 and one or more modules to control the system 500 to operate in accordance with the invention. To control the system 500, the processor 510 uses information, various modules and/or routines including instructions stored in memory 512.

The image acquisition module 515 is configured for receiving and storing content to be encoded. The content, e.g., left and right eye image pairs representing frames of a stereoscopic image sequence, are stored in the memory as stored image data 526. The precoder 516 is configured to process a pair of images including a left eye image and a right eye image, each of said left and right eye images including image values of a first type, e.g., luminance values or chrominance values, to perform various precoding operations in accordance with the embodiments of the invention. Thus in some embodiments various steps discussed with regard to routines 100 through 400 are implemented by the precoder 516.

In some embodiments the precoder 516 is configured to generate a first overall disparity value indicating a first overall level of difference between values of a first type in a left eye image and values of the first type in a right eye image, e.g., in the received left and right eye image pair. In some embodiments the values of the first type are one of luminance values, chrominance values corresponding to a first color ($C_R$), or chrominance values corresponding to a second color ($C_B$). In some embodiments the precoder 516 is further configured to determine if the first overall disparity value is in a first difference range used to control performing of a first difference reduction operation, the first difference reduction operation being an operation on values of the first type included in at least one of the left eye image or the right eye image to reduce the overall difference between values of the first type in the left eye image and values of the first type in the right eye image, and perform the first difference reduction operation to reduce the first overall level of difference between values of the first type in the left eye image and values of the first type in the right eye image when the first overall disparity value is determined to be in the first difference range.

Encoder 518 encodes frames with left and right eye images which have been subject to the precoding operations. The decoder module 520 can be used to decode an encoded stream and to supply it to the display 502. Thus the decoder 520 decodes images which are then output for display on the display 502 in some embodiments. The operator may control, via input device 504, one or more encoding parameters via input device 504 and/or select which of the encoded bitstreams is to be decoded and displayed. The various components of the system 500 are coupled together via bus 508 which allows for data to be communicated between the components of the system 500.

In some embodiments, the video content, e.g., left and right eye images of a 3D image sequence, inputted by the camera 509, e.g., a stereoscopic camera, are stored in the memory 512 for example in stored image data 526. The precoder module 516 processes the left and right eye image data to reduce differences between the left and right eye images. This has the advantage of increasing encoding efficiency when encoding the left and right eye images when using a differential encoder and/or another encoder which encodes one of the left and right eye images based on the content of the other one of the left and right eye images. In addition to providing improved encoding efficiency in at least some embodiments the difference reduction techniques improve perceived decoded image quality by reducing differences in the left and right eye images which may be due to reflections and/or saturation of the input sensor of one of the eye images and/or other image capture related issues. The encoder module 518 encodes the precoded image data to generate encoded data. The processing steps shown in FIGS. 1-4 may be, and in some embodiments are, performed by the precoder module or a module which processes left and right eye images. In at least some embodiments of the present invention, some or all of the processing occurring in the precoder module is incorporated into the encoding module. The encoded content can be, and in some embodiments is, streamed to one or multiple different devices via the network interface 530. The video content to be precoded and/or encoded can also be streamed through network interface 530. The decoder module 520 can be, and in some embodiments is, used to decode an encoded stream and to supply it to the display 502. In this manner an operator of system 500 can view the result of the precoding and encoding processes. The operator, e.g., administrator, may control one or more precoding and encoding parameters via input device 504 and/or select which of the precoded and encoded bit streams is to be decoded and displayed via input device 504. The precoding parameters inputted by the operator may be stored in memory 512 for use during processing.

Figure 8:
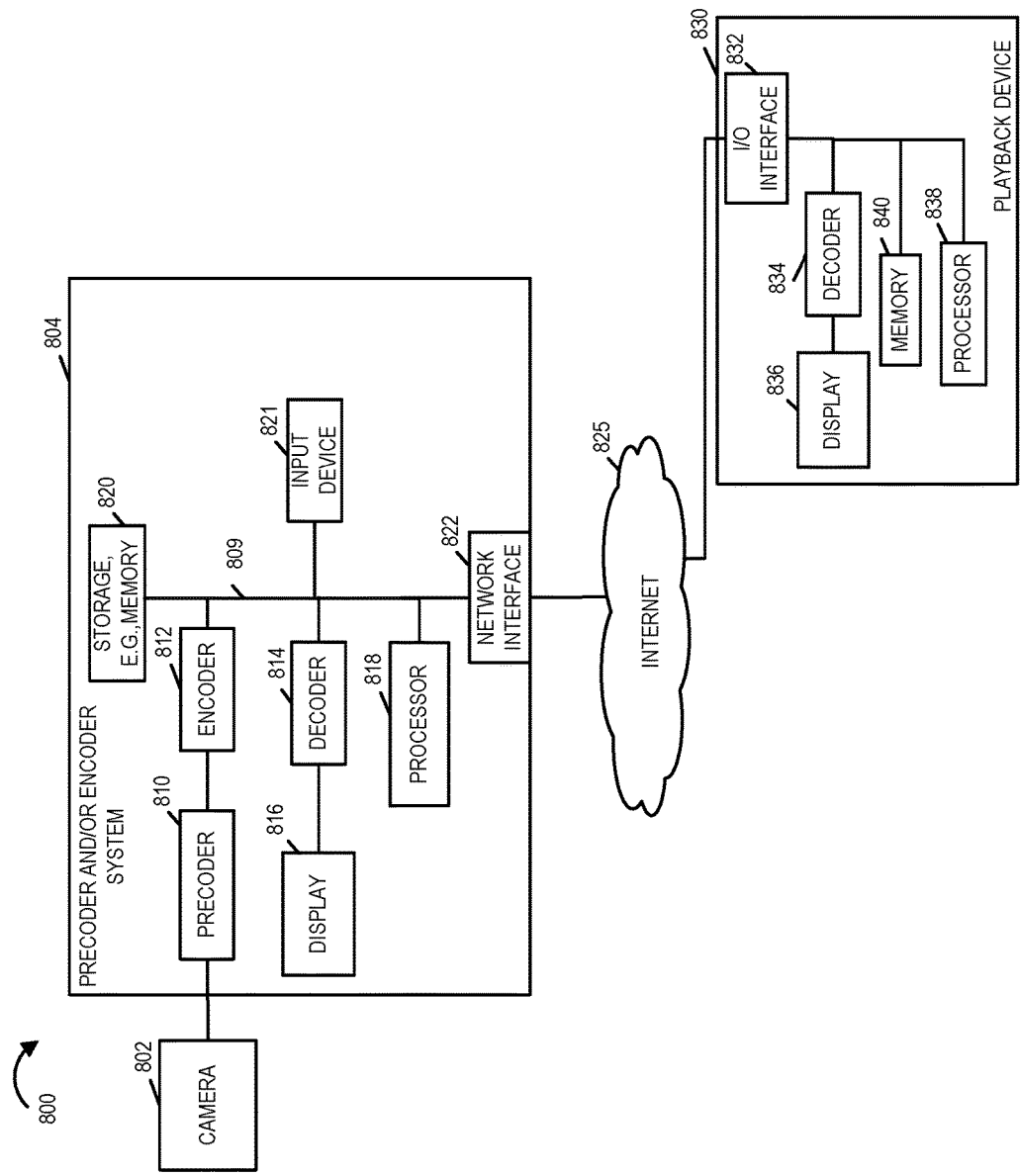
FIG. 8 illustrates an exemplary system that implements an embodiment of the present invention.

FIG. 8 illustrates an exemplary system 800 implemented in accordance with an exemplary embodiment of the invention. The exemplary system 800 includes camera 802, a precoder and/or encoder system 804 and a playback device 830 in accordance with an exemplary embodiment.

The camera 802 in some embodiments is a stereoscopic camera and provides inputs, e.g., left and right eye images, to the precoder and/or encoder system 804. It should be appreciated that the precoder and/or encoder system 804 performs the same functions and operation as discussed above with regard to the system 500 however in the FIG. 8 embodiment the various elements of the precoder and/or encoder system 804 are implemented in hardware, e.g., as individual circuits. The precoder and/or encoder system 804 includes a precoder 810, an encoder 812, a decoder 814, a display 816, a processor 818, a storage device 820, an input device 821 and a network interface 822. Various elements of the precoder and/or encoder system 804 are coupled together via bus 809 which allows for data to be communicated between the elements.

The received input from the camera, e.g., left and right eye image pairs of a stereoscopic e.g., 3D, image sequence, may be stored in the memory 820 and is used for performing further processing in accordance with the invention. Thus the left and right eye images are supplied from the camera 802 to the precoder 810. The precoder 810 is configured to process received image pairs, e.g., the left eye image and a right eye image, to perform various precoding operations in accordance with the embodiments of the invention. In various embodiments each of said left and right eye images include image values of a first type, e.g., luminance values or chrominance values. In some embodiments the precoder 810 is configured to implement/perform the precoding operations discussed in the steps of routines 100-400. As will be discussed, in some embodiments the precoder 810 includes one or more modules for performing various precoding operations discussed above. Depending on the embodiment, such modules may be implemented completely in hardware, software or as a combination of software and hardware.

The encoder 812 encodes frames with left and right eye images which have been subject to the precoding operations. The decoder 814 can be used to decode an encoded stream and to supply it to the display 816. Thus in some embodiments the decoder 814 decodes images which are then output for display on the display 816.

The processor 818, e.g., a CPU, controls the operation of the precoder and/or encoder system 804 in accordance with the invention. In various embodiments the processor executes routines to control the precoder and/or encoder system 804 to operate in accordance with the invention. To control the precoder and/or encoder system 804, the processor 818 uses information and/or routines including instructions included in the memory 820. An operator of the precoder and/or encoder system 804 may control the system via various control parameters an/or threshold setting which may be input and set via input device 821.

In some embodiments, encoded image data generated after the precoding processing operations have been performed on received stereoscopic images, is communicated, e.g., over the internet or another communications network, via the network interface 822 to a content playback device such as the playback device 830.

The exemplary content playback device 830 includes an input/output (I/O) interface 832, a decoder 834, a display 836, a processor 838 and memory 840. The playback device receives content, e.g., encoded stereoscopic images, via the I/O interface 832. The received content is supplied to the decoder 834 for processing. The decoder 834 recovers the image data by performing decoding operations in accordance with the invention. The decoded image data is stored in the memory 840. As per a user's desire the decoded image data may be, and in some embodiments is, supplied to the display 836 for display.

Figure 9:
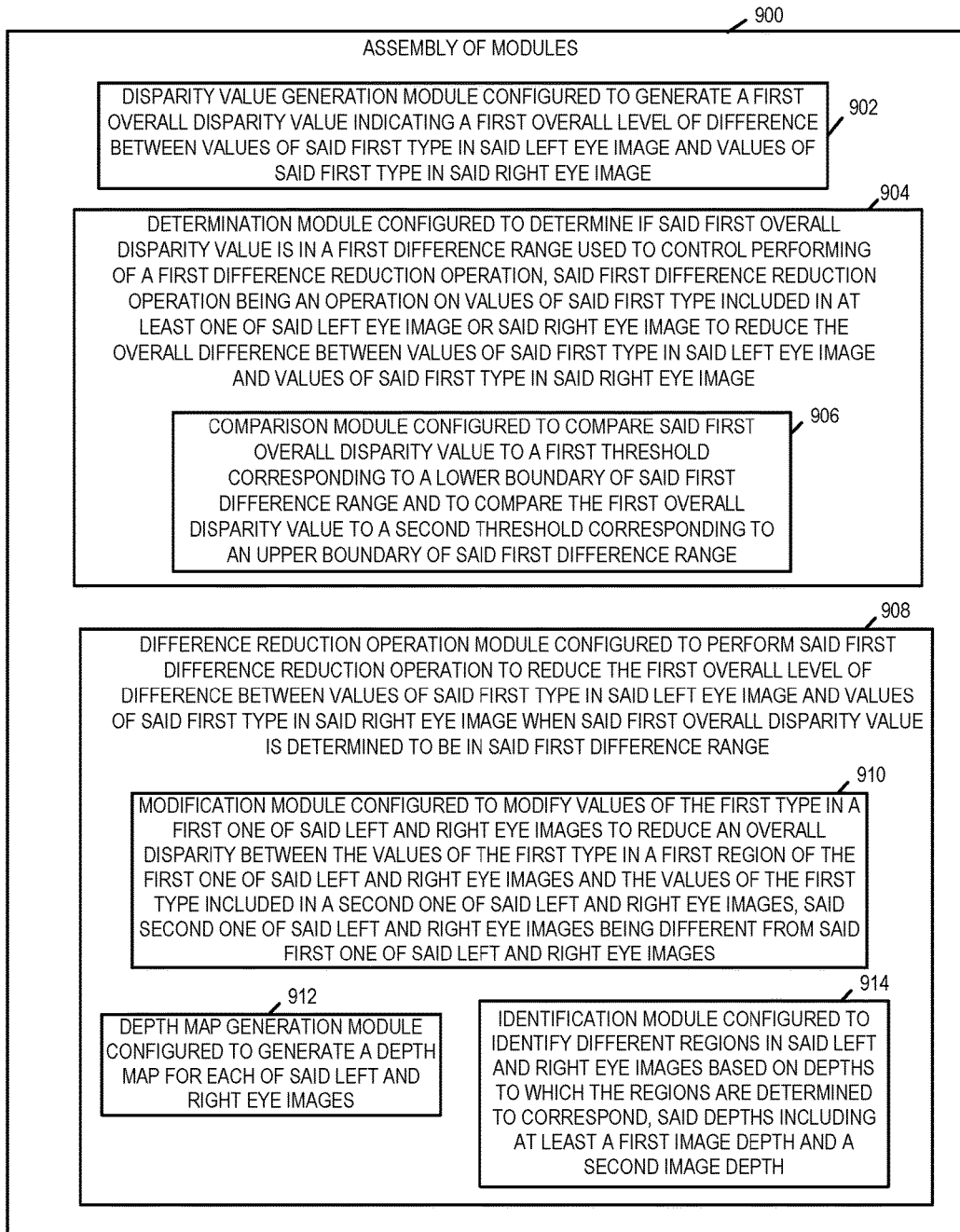
FIG. 9 illustrates an assembly of modules which may be used in the apparatus of FIG. 5 or the precoder of FIG. 8.

FIG. 9 is an assembly of modules 900 which can, and in some embodiments is, used in the precoder and/or encoder system 500 illustrated in FIG. 5 and/or the precoder and/or encoder system 804 illustrated in FIG. 8. Assembly of modules 900 can be implemented in hardware within the precoder 810 of FIG. 8 and/or precoder 516 of FIG. 5. The modules in the assembly 900 can, and in some embodiments are, implemented fully in hardware within the precoder 810, e.g., as individual circuits. In some other embodiments some of the modules are implemented, e.g., as circuits, within the precoder 810 with other modules being implemented, e.g., as circuits, external to and coupled to the precoder.

Alternatively, rather than being implemented as circuits, all or some of the modules may be implemented in software and stored in the memory 512, e.g., as assembly of modules 528, as shown in FIG. 5 and/or in the memory 820 with the modules controlling operation of the precoder 516 and/or precoder 810 to implement the functions corresponding to the modules when the modules are executed by a processor, e.g., processor 510 or processor 818. In still other embodiments, various modules are implemented as a combination of hardware and software.

While shown in the FIG. 5 embodiment as a single processor, e.g., computer, it should be appreciated that the processor 510 may be implemented as one or more processors, e.g., computers.

When implemented in software the modules include code, which when executed by the processor 510, configure the processor 510 to implement the function corresponding to the module. In embodiments where the assembly of modules 900 is stored in the memory 512, the memory 512 is a computer readable medium comprising code, e.g., individual code for each module, for causing at least one computer, e.g., processor 512, to implement the functions to which the modules correspond.

Thus completely hardware based or completely software based modules may be used. However, it should be appreciated that any combination of software and hardware, e.g., circuit implemented modules may be used to implement the functions. As should be appreciated, the modules illustrated in FIG. 9 control and/or configure the precoder and/or encoder system 500 or 804, or elements therein such as the processors 510 and/or 818, to perform the functions of the corresponding steps illustrated in the flow charts shown in FIGS. 1-4.

As illustrated in FIG. 9, the assembly of modules 900 includes a disparity value generation module 902 configured to generate a first overall disparity value indicating a first overall level of difference between values of a first type in a left eye image and values of the first type in a right eye image. The left and right eye images are, e.g., stereoscopic images, received from a camera, e.g., camera 802. In some embodiments the values of the first type are luminance values. In some embodiments the values of the first type are chrominance values corresponding to a first color ($C_R$), or chrominance values corresponding to a second color ($C_R$).

The assembly of modules 900 further includes a determination module 904 configured to determine if the first overall disparity value is in a first difference range used to control performing of a first difference reduction operation, the first difference reduction operation being an operation on values of the first type included in at least one of the left eye image or the right eye image to reduce the overall difference between values of the first type in the left eye image and values of the first type in the right eye image. In various embodiments the determination module 904 includes a comparison module 906 configured to compare the first overall disparity value to a first threshold corresponding to a lower boundary of said the difference range, and to compare the first overall disparity value to a second threshold corresponding to an upper boundary of the first difference range. In some embodiments the determination module 904 is configured to determine that the overall disparity value is in the first difference range when a result of a comparison performed by the comparison module 906 indicates that said first overall disparity value is above said first threshold and below said second threshold.

The assembly of modules 900 further includes a difference reduction operation module 908 configured to perform the first difference reduction operation to reduce the first overall level of difference between values of the first type in the left eye image and values of the first type in the right eye image when the first overall disparity value is determined to be in the first difference range. For example, in some embodiments a difference reduction operation is triggered when the determination module 904 determines that there is, e.g., more than 25% difference and less than 70% overall luminance difference between left and right eye images. In various embodiments the difference reduction operation module 908 includes a modification module 910 configured to modify values of the first type in a first one of the left and right eye images to reduce an overall disparity between the values of the first type in a first region of the first one of said left and right eye images and the values of the first type included in a second one of said left and right eye images, said second one of said left and right eye images being different from said first one of said left and right eye images. In some embodiments the difference reduction operation module 908 further includes a depth map generation module 912 configured to generate a depth map for each of the left and right eye images, and an identification module 914 configured to identify different regions in the left and right eye images based on depths to which the regions are determined to correspond, the depths include at least a first image depth and a second image depth.

In some embodiments the first image depth corresponds to a first distance range from a camera to objects in an image region identified as corresponding to the first image depth and a second image depth corresponds to a second distance range from the camera to objects in an image region identified as corresponding to the second image depth, the first and second image depths being different. In some embodiments the first and second image depths correspond to foreground and background image regions, respectively.

Some embodiments are directed a non-transitory computer readable medium embodying a set of software instructions, e.g., computer executable instructions, for controlling a computer or other device to encode and compresses stereoscopic video. Other embodiments are embodiments are directed a computer readable medium embodying a set of software instructions, e.g., computer executable instructions, for controlling a computer or other device to decode and decompresses video on the player end. While encoding and compression are mentioned as possible separate operations, it should be appreciated that encoding may be used to perform compression and thus encoding may, in some include compression. Similarly, decoding may involve decompression.

The techniques of various embodiments may be implemented using software, hardware and/or a combination of software and hardware. Various embodiments are directed to apparatus, e.g., a video data processing system. Various embodiments are also directed to methods, e.g., a method of processing video data. Various embodiments are also directed to machine, e.g., computer, readable medium, e.g., ROM, RAM, CDs, hard discs, etc., which include machine readable instructions for controlling a machine to implement one or more steps of a method.

Various features of the present invention are implemented using modules. Such modules may, and in some embodiments are, implemented as software modules. In other embodiments the modules are implemented in hardware. In still other embodiments the modules are implemented using a combination of software and hardware. A wide variety of embodiments are contemplated including some embodiments where different modules are implemented differently, e.g., some in hardware, some in software, and some using a combination of hardware and software. It should also be noted that routines and/or subroutines, or some of the steps performed by such routines, may be implemented in dedicated hardware as opposed to software executed on a general purpose processor. Such embodiments remain within the scope of the present invention. Many of the above described methods or method steps can be implemented using machine executable instructions, such as software, included in a machine readable medium such as a memory device, e.g., RAM, floppy disk, etc. to control a machine, e.g., general purpose computer with or without additional hardware, to implement all or portions of the above described methods. Accordingly, among other things, the present invention is directed to a machine-readable medium including machine executable instructions for causing a machine, e.g., processor and associated hardware, to perform one or more of the steps of the above-described method(s).

Numerous additional variations on the methods and apparatus of the various embodiments described above will be apparent to those skilled in the art in view of the above description. Such variations are to be considered within the scope.

What is claimed is:

1. A method of processing a pair of images including a left eye image and a right eye image, each of said left and right eye images including image values of a first type, the method comprising:
   generating a first overall disparity value indicating a first overall level of difference between values of said first type in said left eye image and values of said first type in said right eye image by generating a sum of luminance difference values, the generated sum being the first overall disparity value;
   determining if said first overall disparity value is in a first difference range used to control performing of a first difference reduction operation, said first difference reduction operation being an operation on values of said first type included in at least one of said left eye image or said right eye image to reduce the overall difference between values of said first type in said left eye image and values of said first type in said right eye image;
   performing said first difference reduction operation to reduce the first overall level of difference between values of said first type in said left eye image and values of said first type in said right eye image when said first overall disparity value is determined to be in said first difference range, and
   wherein performing said first difference reduction operation to reduce the first overall level of difference between values of said first type includes treating pixel values corresponding to a foreground image portion differently from pixel values corresponding to a background image portion.

2. The method of claim 1, wherein the first overall disparity value is an indication of the overall luminance disparity between the left and right eye images being processed.

3. The method of claim 2,
   wherein said first overall disparity value is a difference between a sum of luminance values in said left eye image and a sum of luminance values in said right eye image.

4. A method of processing a pair of images including a left eye image and a right eye image, each of said left and right eye images including image values of a first type, the method comprising:
   generating, by summing a plurality of difference values, a first overall disparity value indicating a first overall level of difference between values of said first type in said left eye image and values of said first type in said right eye image, said values of a first type are chrominance values;
   determining if said first overall disparity value is in a first difference range used to control performing of a first difference reduction operation, said first difference reduction operation being an operation on values of said first type included in at least one of said left eye image or said right eye image to reduce the overall difference between values of said first type in said left eye image and values of said first type in said right eye image;
   performing said first difference reduction operation to reduce the first overall level of difference between values of said first type in said left eye image and values of said first type in said right eye image when said first overall disparity value is determined to be in said first difference range; and
   wherein performing said first difference reduction operation to reduce the first overall level of difference between values of said first type in said left and right eye images includes changing at least some chrominance values in at least one of said left and right eye images.

5. The method of claim 4,
   wherein the first difference reduction operation is not performed on a foreground image region of said left and right eye images; and
   wherein the first difference reduction operation is performed on a background region of said left and right eye images.

6. The method of claim 4, wherein said step of changing at least some of the chrominance values includes limiting the change in chrominance values to a maximum amount of change which is less than a maximum amount of change used for values of another type.

7. The method of claim 1, wherein values of said first type are luminance values;
   wherein performing said first difference reduction operation to reduce the first overall level of difference between values of said first type includes changing at least some luminance values.

8. The method of claim 6,
   wherein determining if said first overall disparity value is in the first difference range used to control performing of the first difference reduction operation further includes:

comparing said first overall disparity value to a first threshold corresponding to a lower boundary of said first difference range; and comparing said first overall disparity value to a second threshold corresponding to an upper boundary of said first difference range.

9. The method of claim 8, wherein determining if said first overall disparity value is in the first difference range used to control performing of the first difference reduction operation further includes:

determining that said overall disparity value is in the first difference range when said comparing steps indicate that said first overall disparity value is above said first threshold and below said second threshold.

10. A method of processing a pair of images including a left eye image and a right eye image, each of said left and right eye images including image values of a first type, the method comprising:

generating, by summing multiple difference values, a first overall disparity value indicating a first overall level of difference between values of said first type in said left eye image and values of said first type in said right eye image, said values of a first type are chrominance values;

determining if said first overall disparity value is in a first difference range used to control performing of a first difference reduction operation, said first difference reduction operation being an operation on values of said first type included in at least one of said left eye image or said right eye image to reduce the overall difference between values of said first type in said left eye image and values of said first type in said right eye image;

performing said first difference reduction operation to reduce the first overall level of difference between values of said first type in said left eye image and values of said first type in said right eye image when said first overall disparity value is determined to be in said first difference range; and wherein performing said first difference reduction operation includes:

modifying values of the first type in a first one of said left and right eye images; and using a depth map in determining what pixel values to modify as part of a disparity reduction operation.

11. A method of processing a pair of images including a left eye image and a right eye image, each of said left and right eye images including image values of a first type, the method comprising:

generating, by summing a plurality of difference values, a first overall disparity value indicating a first overall level of difference between values of said first type in said left eye image and values of said first type in said right eye image, said values of a first type are chrominance values;

determining if said first overall disparity value is in a first difference range used to control performing of a first difference reduction operation, said first difference reduction operation being an operation on values of said first type included in at least one of said left eye image or said right eye image to reduce the overall difference between values of said first type in said left eye image and values of said first type in said right eye image;

performing said first difference reduction operation to reduce the first overall level of difference between values of said first type in said left eye image and values of said first type in said right eye image when said first overall disparity value is determined to be in said first difference range, said step of performing said first difference reduction operation including:

generating a depth map for each of said left and right eye images; and identifying different regions in said left and right eye images based on depths to which the regions are determined to correspond, said depths including at least a first image depth and a second image depth.

12. A method of processing a pair of images including a left eye image and a right eye image, each of said left and right eye images including image values of a first type, the method comprising:

generating a first overall disparity value indicating a first overall level of difference between values of said first type in said left eye image and values of said first type in said right eye image, said values of a first type are chrominance values, said step of generating a first overall disparity value including:

i) generating a left eye histogram of pixel values;
ii) generating a right eye histogram of pixel values; and
iii) generating said overall disparity value from said left eye histogram of pixel values and the right eye histogram of pixel values;

determining if said first overall disparity value is in a first difference range used to control performing of a first difference reduction operation, said first difference reduction operation being an operation on values of said first type included in at least one of said left eye image or said right eye image to reduce the overall difference between values of said first type in said left eye image and values of said first type in said right eye image; and performing the first difference reduction operation to reduce the first overall level of difference between values of said first type in said left eye image and values of said first type in said right eye image when said first overall disparity value is determined to be in said first difference range.

13. An apparatus for processing a pair of images including a left eye image and a right eye image, each of said left and right eye images including image values of a first type, comprising:

a disparity value generation module configured to generate, by summing a plurality of difference values, a first overall disparity value indicating a first overall level of difference between values of said first type in said left eye image and values of said first type in said right eye image;

a determination module configured to determine if said first overall disparity value is in a first difference range used to control performing of a first difference reduction operation, said first difference reduction operation being an operation on values of said first type included in at least one of said left eye image or said right eye image to reduce the overall difference between values of said first type in said left eye image and values of said first type in said right eye image; and a difference reduction operation module configured to perform said first difference reduction operation to reduce the first overall level of difference between values of said first type in said left eye image and values of said first type in said right eye image when said first overall disparity value is determined to be in said first difference range, said first difference reduction operation to reduce the first overall level of difference between values of said first type treating pixel values corresponding to a foreground image portion differently from pixel values corresponding to a background image portion.

14. The apparatus of claim 13, wherein said values of said first type are luminance values; and wherein the first overall disparity value is an indication of the overall luminance disparity between the left and right eye images being processed.

15. The apparatus of claim 13, wherein the difference reduction operation module is configured to modify at least some luminance values.

16. The apparatus of claim 13, wherein said determination module includes a comparison module configured to compare said first overall disparity value to a first threshold corresponding to a lower boundary of said first difference range and to compare said first overall disparity value to a second threshold corresponding to an upper boundary of said first difference range.

17. The apparatus of claim 16, wherein said determination module is further configured to determine that said overall disparity value is in the first difference range, when a result of a comparison performed by said comparison module indicates that said first overall disparity value is above said first threshold and below said second threshold.

18. The method of claim 4, wherein the first overall disparity value is an indication of the overall chrominance disparity between the left and right eye images being processed.

19. The method of claim 4, wherein said difference values are chrominance difference values.

\* \* \* \* \*